US010770908B2

(12) United States Patent
Verbridge

(10) Patent No.: US 10,770,908 B2
(45) Date of Patent: Sep. 8, 2020

(54) CONFIGURABLE BATTERY PACK FOR SERIES AND PARALLEL CHARGING USING SWITCHING

(71) Applicant: Rivian IP Holdings, LLC, Plymouth, MI (US)

(72) Inventor: Mason Verbridge, Canton, MI (US)

(73) Assignee: Rivian IP Holdings, LLC, Plymouth, MI (US)

( * ) Notice: Subject to any disclaimer, the term of this patent is extended or adjusted under 35 U.S.C. 154(b) by 84 days.

(21) Appl. No.: 16/004,258

(22) Filed: Jun. 8, 2018

(65) Prior Publication Data

US 2019/0126761 A1    May 2, 2019

Related U.S. Application Data

(60) Provisional application No. 62/578,500, filed on Oct. 29, 2017.

(51) Int. Cl.
| | | |
|---|---|---|
| *H01M 10/44* | (2006.01) | |
| *H01M 10/46* | (2006.01) | |
| *H02J 7/00* | (2006.01) | |
| *B60L 53/10* | (2019.01) | |
| *H01M 2/10* | (2006.01) | |

(Continued)

(52) U.S. Cl.
CPC ............. *H02J 7/0024* (2013.01); *B60L 53/11* (2019.02); *H01M 2/1077* (2013.01); *H01M 2/206* (2013.01); *H01M 2/305* (2013.01); *H01M 10/425* (2013.01); *H01M 10/441* (2013.01); *H02J 7/0026* (2013.01); *H01M 2010/4271* (2013.01); *H01M 2220/20* (2013.01)

(58) Field of Classification Search
CPC ...... H02J 7/0024; H02J 7/0026; H02J 7/0021; H02J 2007/0037; H02J 2007/004
USPC .................. 320/107, 117, 121, 132, 134, 136
See application file for complete search history.

(56) References Cited

U.S. PATENT DOCUMENTS

2014/0184162 A1    7/2014  Takahashi et al.
2014/0368041 A1*  12/2014  Tu et al. ............. B60L 11/1861
                                                                307/52

FOREIGN PATENT DOCUMENTS

DE      10 2016 223 470      6/2017
JP           2008-278635      11/2008

OTHER PUBLICATIONS

Translation of DE 10 2016 223 470 A1 (Jun. 22, 2017) (Year: 2017).*

(Continued)

*Primary Examiner* — Edward Tso
(74) *Attorney, Agent, or Firm* — Haley Guilliano LLP

(57) ABSTRACT

A configurable battery system may be arranged in such a way that two battery modules are connected in parallel to achieve a target maximum voltage for a load, or in series to achieve a high voltage of about double the target maximum voltage. Fast charging, at high voltage, may allow both battery modules to be charged at a charging current near a desired maximum current at the battery charger. A battery management module determines a switch configuration, coupling the battery modules in series or parallel. The battery management module applies the switch configuration to one or more switches to manage charging of the battery modules. The battery management module may receive charger capability information, local charging information, and fault information to aid in determining a switch configuration.

30 Claims, 10 Drawing Sheets

(51) Int. Cl.
*H01M 2/20* (2006.01)
*H01M 2/30* (2006.01)
*H01M 10/42* (2006.01)

(56) References Cited

OTHER PUBLICATIONS

Electric Vehicle Conductive Charge Coupler SAE J1772. Prepared by SAE EV Charging Systems Committee. 2001. Available online at https://www.arb.ca.gov/msprog/zevprog/stakeholders/infrastructure/finalsaej1772.doc.
International Search Report and Written Opinion in Application No. PCT/US2018/057866, dated Mar. 26, 2019 (17 Pages).

* cited by examiner

1200

Identify, with control circuitry, a fault occurrence in a battery module of a plurality of battery modules while at least one switch is in a first switch configuration
1202

Determine a second switch configuration in response to identifying the fault occurrence in the one battery module
1204

Apply the second switch configuration to the at least one switch, wherein the at least one switch in the second switch configuration de-couples the battery module having the fault occurrence from the electric load
1206

Receive, using control circuitry, capability information from a battery charger coupled to the battery pack
1302

Determine whether the battery charging system is capable of fast charging based on the capability information
1304

Apply, using the control circuitry, a switch configuration to at least one mode switch to perform fast charging in response to determining that the battery charging system is capable of fast charging
1306

Receive, using control circuitry, battery charging system capability information from the battery charging system
1404

Retrieve local charging information regarding a battery pack
1406

Determine a switch configuration to at least one switch to either connect the first battery module and the second battery module in series or parallel, based at least in part on the battery charging system capability information and the local charging information
1408

Apply the switch configuration to the at least one switch
1410

FIG. 14

CONFIGURABLE BATTERY PACK FOR SERIES AND PARALLEL CHARGING USING SWITCHING

The present disclosure is directed to a configurable battery that provides improved charging and operation. This application claims the benefit of U.S. Provisional Patent Application No. 62/578,500 filed Oct. 29, 2017, the disclosure of which is hereby incorporated by reference herein in its entirety.

BACKGROUND

Battery chargers and their accompanying electrical components (e.g., cables and charge inlet) typically have current restrictions. To achieve more charging current for a battery charger (e.g., during a fast charge), large DC fast charge cables are usually required. Battery chargers also typically have a maximum limit in supply voltage. For example, SAE J1772 targets 900V and 400 A for the maximum output of a typical DC fast charger for electric vehicles. In order to increase the charging rate, the current-carrying capacity of electronics, components and leads typically need to be increased to handle larger currents, as does the heat removal capacity. For example, ohmic heating increases as the square of current. Accordingly, it would be advantageous to increase the charging rate without the need for larger current rated components.

In addition, battery operated devices (e.g., electric vehicles) typically use components (e.g., AC compressor, PTC heater, drive unit, etc.) that are designed to operate at a maximum voltage level. Battery operated devices also typically need to be able to operate while charging. Accordingly, it would be advantageous to increase the charging rate without increasing the voltage applied to the load of battery operated devices.

Battery systems also typically include more than one battery module. If a fault occurs in a battery module, the entire battery system likely needs to be disconnected from the load. Accordingly, it would be advantageous to manage a fault occurrence in a battery module without having to disconnect the load or cause a different voltage to be applied to the load.

SUMMARY

A configurable battery system according to the present disclosure includes a first battery module and a second battery module, in which each battery module includes a positive terminal and a negative terminal. The configurable battery system also includes at least one switch having at least two poles. In a high voltage configuration of the at least one switch, the first battery module and the second battery module are connected in series. In a low voltage configuration of the at least one switch, the first battery module and the second battery module are connected in parallel.

In some embodiments, the at least one switch includes a first single pole double throw (SPDT) switch and second SPDT switch. In the high voltage configuration, the first SPDT switch and the second SPDT switch are each in a first switch position, thereby connecting the positive terminal of the first battery module to the negative terminal of the second battery module. In the low voltage configuration, the first SPDT switch is in a second switch position, thereby connecting the negative terminal of the first battery module to the negative terminal of the second battery module. Further, in the low voltage configuration, the second SPDT switch is in a second switch position, thereby connecting the positive terminal of the first battery module to the positive terminal of the second battery module.

In some embodiments, the at least one switch includes two single pole single throw (SPST) switches. In the high voltage configuration, a first of the two SPST switches is in an off position, and a second of the two SPST switches is in an on position, thereby connecting the positive terminal of the first battery module to the negative terminal of the second battery module. In the low voltage configuration, the first of the two SPST switches is in an on position, thereby connecting the negative terminal of the first battery module to the negative terminal of the second battery module, and the second of the two SPST switches is in an off position.

In some embodiments, the configurable battery system includes at least one charger switch configured to connect and disconnect the first and second battery modules to a charger. For example, the at least one charger switch may include a SPST contactor for connecting and disconnecting the charger.

In some embodiments, in the high voltage configuration, a positive terminal of a device load is connected to the positive terminal of the first battery module, and a negative terminal of the device load is connected the negative terminal of the first battery module. For example, the device load may include any system or subsystem of an electric vehicle.

In some embodiments, the configurable battery system includes at least one load switch having at least two poles. In the high voltage configuration, when the at least one load switch is set to a first switch position or positions, a positive terminal of a device load is connected to the positive terminal of the first battery module, and a negative terminal of the device load is connected to the negative terminal of the first battery module. Further, in the high voltage configuration, when the at least one load switch is set to a second switch position or positions, the positive terminal of the device load is connected to the positive terminal of the second battery module, and the negative terminal of the device load is connected to the negative terminal of the first battery module.

In some embodiments, the configurable battery system includes control circuitry configured to, when in the high voltage configuration, set the position of at least one load switch based on status information of the first battery module, the second battery module, or both.

In some embodiments, the configurable battery system is configured for use in an electric vehicle, and in the high voltage configuration, the configurable battery charging system is configured to receive a charging voltage of 900 volts (V). In some embodiments, in the charging configuration, the configurable battery charging system is configured to provide a voltage of 450 V to components of the electric vehicle. In some embodiments, the configurable battery system includes a battery management module configured to select between the low voltage configuration and the high voltage configuration.

In some embodiments, a battery management module manages battery charging of a first battery module and a second battery module that are coupled in series. The battery management module uses at least one switch in a first switch configuration to couple an electric load in parallel to the first battery module during charging. The battery management module determines a first battery characteristic of the first battery module and a second battery characteristic of the second battery module during charging. The battery management module determines to apply a second switch configuration to the at least one switch based on the first battery characteristic and the second battery characteristic. The second switch configuration couples the electric load in parallel to the second battery module during charging. The battery management module applies the second switch configuration to the at least one switch.

In some embodiments, the first battery characteristic includes a first voltage across a positive terminal and a negative terminal of the first battery module, and the second battery characteristic includes a second voltage across a positive terminal and a negative terminal of the second battery module. In some embodiments, a battery management module determines to apply the second switch configuration to the at least one switch based on a difference between the first voltage and the second voltage.

In some embodiments, the first battery characteristic includes a first cumulative time of the first battery module being coupled to the electric load, and the second battery characteristic includes a second cumulative time of the second battery module being coupled to the electric load. For example, a cumulative time of a battery being coupled to an electric load may provide a convenient way of using battery modules equally during charging. In a further example, the battery management module determines a difference between the first cumulative time and the second cumulative time.

In some embodiments, the battery management module determines local charging information, which may include a preference to charge at high voltage. In some embodiments, the battery management module determines to couple the first battery module and the second battery module in series based at least in part on local charging information. For example, if the battery charger is capable of fast charging (e.g., high voltage charging), the battery management module determines to couple the first and second battery modules in series.

In some embodiments, the battery management module identifies whether a fault has occurred in the first battery module, the second battery module, or both. In some such embodiments, the battery management module determines to apply the second switch configuration to the at least one switch is further based at least in part on whether the fault has occurred.

In some embodiments, the battery management module applies a pre-charge configuration to the at least one switch to reduce in-rush current when applying the second load switch configuration to the at least one switch. For example, the pre-charge configuration may include connecting a circuit having a capacitor and resistor to reduce the voltage difference across the at least one switch prior to changing the position of the at least one switch.

In some embodiments, the battery management module determines an elapsed time since a previous change in a switch configuration. In some such embodiments, the battery management module determines to apply the second switch configuration based at least in part on the elapsed time. For example, if the determined elapsed time is above a threshold, the battery management module may determine to connect the electric load to the other battery module to balance usage.

In some embodiments, the battery management module manages a fault in a battery system, which includes a plurality of battery modules and at least one switch. The battery management module identifies a fault occurrence in a battery module of the plurality of battery modules while the at least one switch is in a first switch configuration. The first switch configuration couples the plurality of battery modules in parallel with each other and with an electric load. The battery management module determines a second switch configuration in response to identifying the fault occurrence, and applies the second switch configuration to the at least one switch. The second switch configuration de-couples the battery module having the fault occurrence from the electric load and couples the remaining one or more of the plurality of battery modules not having the fault occurrence to the electric load. Accordingly, the electric load may, for example, continue to receive power during a fault occurrence. In some circumstances, the fault occurrence corresponds to an open circuit within the battery module. In some circumstances, the fault occurrence corresponds to a reduced charge capacity of the battery module.

In some embodiments, the battery management module manages battery charging of a battery pack, which includes a first battery module, a second battery module, and at least one switch. A first switch configuration of the at least one switch couples the first battery module and the second battery module in parallel, and a second switch configuration of the at least one switch couples the first battery module and the second battery module in series. The battery management module receives capability information from a battery charging system coupled to the battery pack. The battery management module determines whether the battery charging system is capable of fast charging based on the capability information. The battery management module applies the second switch configuration to the at least one switch to perform fast charging in response to determining that the battery charging system is capable of fast charging. In some embodiments, capability information includes a maximum charging current, a maximum charging voltage, or both.

In some embodiments, the battery management module manages battery charging of a battery pack. The battery management module receives charging system capability information from a charging system. The battery management module retrieves local charging information regarding the battery pack. The battery management module determines a switch configuration of at least one switch to connect a first and a second battery module in either series or parallel, based at least in part on the charging system capability information and the local charging information. The battery management module applies the switch configuration to the at least one switch. For example, in some embodiments, the battery pack is part of an electric vehicle, and the local charging information comprises a location of the electric vehicle. In a further example, in some embodiments, receiving local charging information includes receiving a user input indicating a desired charging mode. In some embodiments, the charging system capability information includes a maximum charging voltage the charging system is capable of applying for charging.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

FIG. 12 is a flowchart of an illustrative process for managing a fault, in accordance with some embodiments of the present disclosure;

FIG. 13 is a flowchart of an illustrative process for managing battery charging based on battery charger capability information, in accordance with some embodiments of the present disclosure;

FIG. 14 is a flowchart of an illustrative process for managing battery charging, based in part on local charging information, in accordance with some embodiments of the present disclosure.

DETAILED DESCRIPTION

Figure 1:
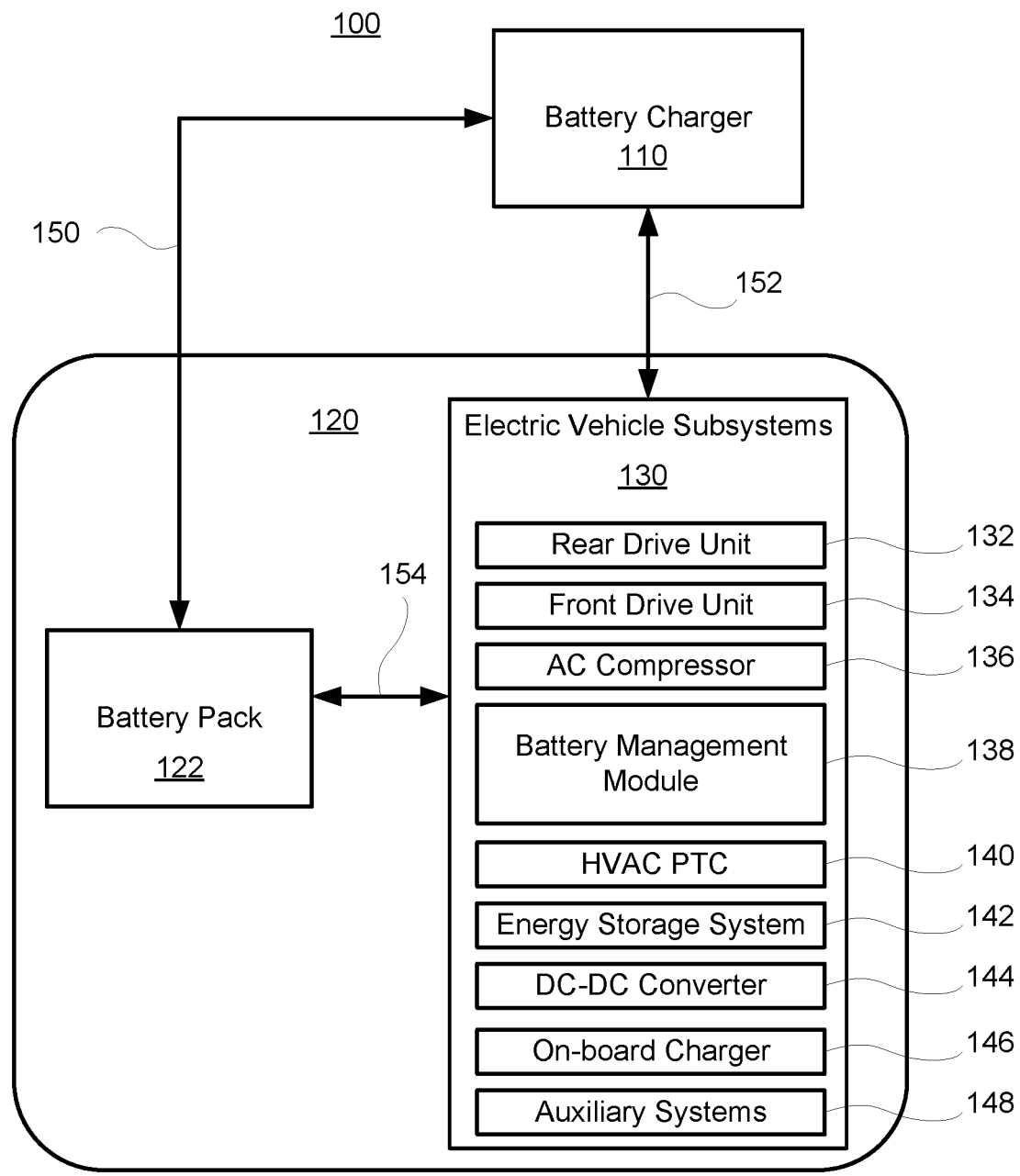
FIG. 1 shows a system diagram of an illustrative battery charger and an illustrative electric vehicle, in accordance with some embodiments of the present disclosure.

A configurable battery system according to the present disclosure, including, for example, an electric-vehicle (EV) battery, may be arranged in such a way that at least two battery modules are wired in parallel to achieve a target maximum voltage for an electric load (e.g., 450 V). For DC fast charging, for example, electrical connections to these battery modules may be reconfigured such that the battery modules are wired in series, achieving a high voltage of double the target maximum voltage (e.g., 900 V for a 450 V target maximum voltage). Fast charging (e.g., high voltage charging) may allow both battery modules to be charged at a charging current near a desired current (e.g., a fixed maximum) at the charge inlet. The charge inlet may include any hardware included in the battery charger, the connection between the battery charger and a battery pack, as well any hardware used to conduct charging current in the battery pack, that may carry current during charging. As compared to low voltage charging (e.g., battery modules wired in parallel) with the same total maximum current limitation, the charging current of each battery module would be nominally halved as compared to fast charging.

A configurable battery system allows the techniques of the present disclosure to be applied to an electric vehicle in some embodiments to more fully utilize a battery charger's potential. In some embodiments, it is desirable to achieve a particular charging target. For example, a charging target of 150 kW at 450 V may require a current of 334 A. In this illustrative example, components may need to be sourced to handle up to 400 A continuously to handle the charging. Such components can be difficult to source, expensive, heavier, or difficult to operate. As mentioned above, SAE J1772 is targeting 900 V, 400 A for the maximum output of a typical DC fast charger. If a battery system were able to take advantage of charging at 900 V, the charging target of 150 kW could be achieved at just 167 A, which may allow for more numerous, better quality, or cheaper options for charging components. For example, a current of 167 A may allow different hardware to be used than if the current were nearer to 400 A. In some embodiments, the limitation in charge rate may be the current that the battery module can accept.

In some embodiments, the configurable battery system of the present disclosure reduces, or eliminates, the charge inlet hardware as being the primary limiter in charge rate, and rather makes the battery modules the bottleneck. For example, as cell chemistry improves and battery cells (e.g., of a battery module) are able to accommodate higher currents, the configurable battery system of the present disclosure may be able to supply the necessary power at the higher current. Lowering the charging current in a DC fast charge circuit (e.g., when modules are in series as compared to parallel) may also reduce, or eliminate, the need for cooling to be applied to the charging hardware, as well as reduce the needed size of the DC fast charge cables. For example, in some circumstances, if battery modules are charged in parallel, cables with cross sections of between 95 mm$^2$ and 120 mm$^2$ may be required. Such cables may be very large, heavy, stiff, and difficult to package. Also, if components become available at higher voltages such as, for example, at 900V (e.g., for electric vehicles), the battery modules of a battery pack may be able to be configured to charge and operate at 900 V for all conditions.

In view of the foregoing, it is desirable in some embodiments to achieve faster charging, at higher voltages (e.g., 900 V for electric vehicles). One solution to achieve this may be to design the battery load to similarly operate at higher voltages. If off-the-shelf components are not available for operating at higher voltages, then custom components may need to be designed. This can be time consuming and expensive. The configurable battery system of the present disclosure provides an improved and simpler solution that can maximize DC fast charging rates. Such a configurable battery system provides competitive charging rates while still enabling the use of off-the-shelf components. For example, the configurable battery of the present disclosure allows for the use of commercially available 450V components for an electric vehicle (e.g., air conditioning (AC) compressor, positive temperature coefficient (PTC) heater, a drive unit, a DC-DC converted, and on-board charger (OBC)) when either a 450V charging source or a 900 V charging source is used. Additionally, in some embodiments, the configurable battery system of the present disclosure may transition seamlessly into a 900V architecture when the market can support it with competitively priced components.

FIG. 1 shows a system diagram of charging arrangement 100, including illustrative battery charger 110 and illustrative electric vehicle 120, in accordance with some embodiments of the present disclosure. Electric vehicle 120 includes battery pack 122, which may include one or more battery modules, and electric vehicle subsystems 130. Electrical vehicle subsystems 130 includes, for example, rear drive unit 132, front drive unit 134, AC compressor 136, battery management module 138, HVAC PTC 140, energy storage system 142, DC-DC converter 144, on-board charger (OBC) 146, auxiliary systems 148, and any suitable corresponding equipment.

In some embodiments, battery management module 138 and on-board charger 146 may be combined. For example, battery management module 138 may be included in on-board charger 146. In some embodiments, battery management module 138 and on-board charger 146 may be partially, or wholly, implemented as separate systems, which may communicate with each other. For example, on-board charger 146 may include connectors for interfacing with a battery charger, and battery management module 138 may connect charging terminals from on-board charger 146 to battery pack 122 via one or more controllable switches. In a further example, battery management module 138 may include a software package, implemented on processing equipment of on-board charger 146, which may include charging hardware (e.g., connections, switches, and sensors).

In some embodiments, battery management module 138 may be configured to manage charging of battery pack 122, which may include measuring one or more battery characteristics of battery pack 122, changing a configuration of one or more switches, identifying if a fault has occurred, providing power to one or more of electric vehicle subsystems 130 (e.g., rear drive unit 132), communicating with battery charger 110, any other suitable actions, or any combination thereof. Battery management module 138 may be coupled to battery pack 122 via coupling 154. Accordingly, battery management module 138 may include, for example, electrical components (e.g., switches, bus bars, resistors, capacitors), control circuitry (e.g., for controlling suitable electrical components), and measurement equipment (e.g., to measure voltage, current, impedance, frequency, temperature, or another parameter).

In some embodiments, electric vehicle 120 may be plugged, or otherwise connected to, battery charger 110 via couplings 150 and 152. For example, a single cable (e.g., having a SAE J1772 charging plug), having more than one conductor of suitable gauge, may be used to couple battery charger 110 to electric vehicle 120. The single cable may include conductors for carrying charging current (e.g., coupling 150) and conductors for transmitting information (e.g., coupling 152). It will be understood that any suitable arrangement of leads may be used in accordance with the present disclosure. For example, in some embodiments, coupling 152 may include both charging leads and information leads, and arrangement 100 need not include coupling 150.

Battery charger 110 may be coupled to a power transmission grid as a power source, and may be configured to provide charging current at a suitable charging voltage to battery pack 122 of electric vehicle 120. In some embodiments, battery charger 110 may be capable of charging a battery pack (e.g., battery pack 122) at one or more voltages, with one or more current limitations. For example, battery charger 110 may, in accordance with SAE J1772, be configured to provide 400 A at 900 V for charging. In a further example, battery charger 110 may receive information from electric vehicle subsystems 130 (e.g., on-board charger 146 via coupling 152) describing what voltage, current, or both, electric vehicle 120 may be charged with. To illustrate, battery charger 110 may be capable of charging electric vehicle 120 at either 450 V (e.g., slow charge) or 900 V (e.g., fast charge), and may provide one of these voltages based on communication with electric vehicle 120. Battery charger 110 may provide a charging current that is limited by one or more constraints. For example, electric vehicle 120 may communicate to battery charger 110 what charging current is desired for charging. In a further example, a cable type (e.g., coupling 150) may have a maximum associated current capacity based on insulation and heat transfer considerations.

In some embodiments, electric vehicle subsystems 130 may be configured to operate at one or more load voltages. For example, battery management module 138 may manage the provision of electric power at 450 V to other subsystems of electric vehicle subsystems 130. In a further example, DC-DC converter 144 may provide 12 V (e.g., converted from a voltage of battery pack 122) to one or more components of electric vehicle 120.

In some embodiments, battery pack 122 includes two or more battery modules, each have having an associated voltage. Battery pack 122 may include bus bars (e.g., for connecting terminals of battery modules, pre-charge circuits or measurements), switches (e.g., contactors for opening and closing battery connections), sensors (e.g., for sensing temperature, voltage, current, impedance, or other parameters), any other suitable components, or any suitable combination thereof.

While in a charging configuration, at least some of electric vehicle subsystems 130 may operate, or otherwise draw power (i.e., be a device load). Battery management module 138 may be configured to manage providing power to subsystems of electric vehicle systems 130, while battery charger 110 is connected (e.g., via coupling s 150 and 152) and providing charging current at a suitable voltage. Accordingly, battery management module 138 may be configured to provide power to subsystems during low voltage charging (e.g., slow charging) or high voltage charging (e.g., fast charging).

A battery management module may be implemented in hardware, software, or a combination thereof. A battery management module may be a standalone module, a module distributed among processing equipment, a module integrated into an existing electric vehicle system, or be a combination thereof.

Figure 2:
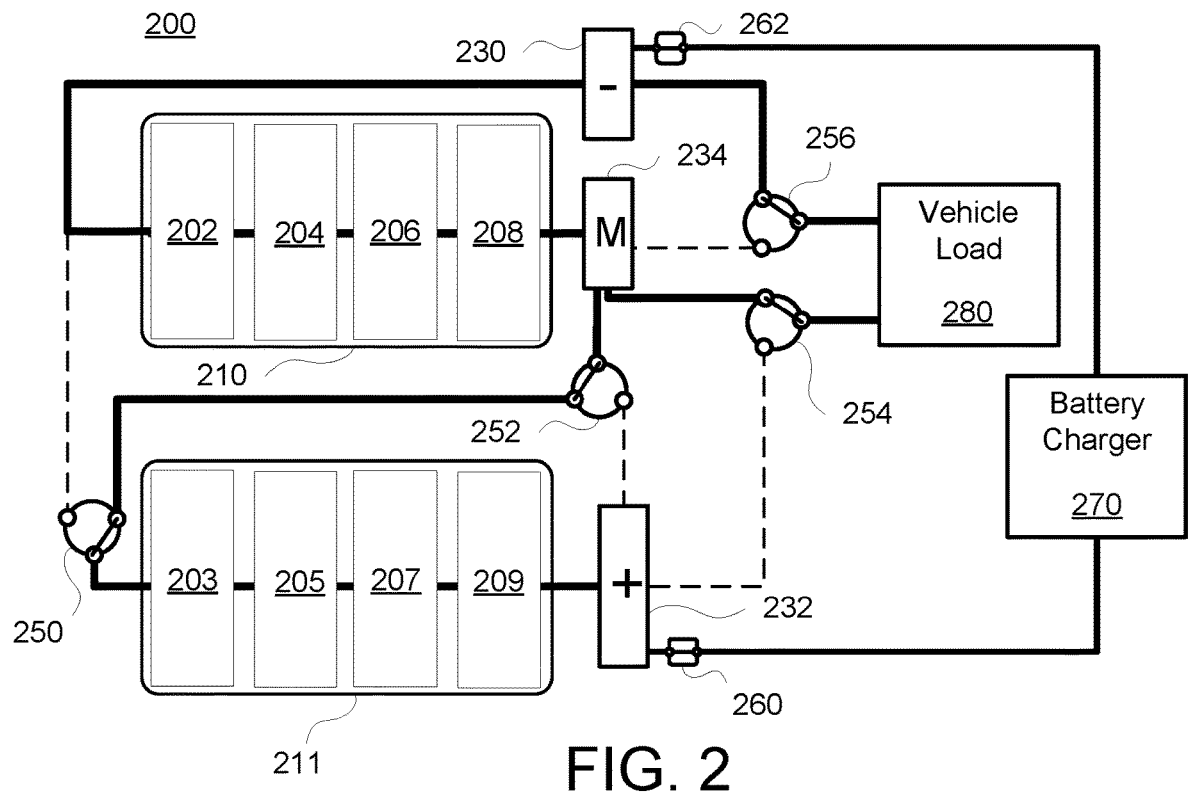
FIG. 2 shows a system diagram of an illustrative arrangement of battery modules, electrical components, and subsystems, in accordance with some embodiments of the present disclosure.

FIG. 2 shows a system diagram of illustrative arrangement 200 of battery modules 210 and 211, electrical components, and subsystems, in accordance with some embodiments of the present disclosure. Each of battery modules 210 and 211 includes a positive terminal and a negative terminal. For example, battery module 210 has a positive terminal connected to busbar 234, and a negative terminal connected to busbar 230. Further, battery module 211 has a positive terminal connected to busbar 232, and a negative terminal connected to switch 250.

Switches 250, 252, 254, and 256, as shown in FIG. 2, are single pole double throw (SPDT). For example, any or all of switches 250, 252, 254, and 256 may be of the "ON-ON" or "ON-OFF-ON" type of SPDT switch. Any or all of switches 250, 252, 254, and 256 may include at least one contactor, relay (e.g., solid state or otherwise), a transistor (e.g., Insulated Gate Bipolar Transistor (IGBT)), any other suitable device for switching a pole between two "on" positions, or any combination thereof. For example, switches 250, 252, 254, and 256 may all be SPDT contactors. In a further example, switches 250, 252, 254, and 256 may each include two single pole single throw (SPST) contactors wired suitably to achieve SPDT connectivity. Switches 260 and 262, as shown in FIG. 2, are each SPST switches, configured to connect and disconnect corresponding terminals of battery charger 270 to busbars 230 and 232. Either or both of switches 260 and 262 may include a contactor, a relay (e.g., solid state or otherwise), a transistor (e.g., Insulated Gate Bipolar Transistor (IGBT)), any other suitable device for switching a pole between an "off" and an "on" position, or any combination thereof.

As shown in FIG. 2, battery modules 210 and 211 are connected in series. For example, switch 250 and switch 252 are configured to connect the positive terminal of battery module 210 to the negative terminal of battery module 211. Vehicle load 280, which may include one or more of electric vehicle subsystems 130 of FIG. 1, is shown connected to battery module 210 by switch 256 and switch 254. As shown in FIG. 2, switch 256 connects busbar 230 to a negative terminal of vehicle load 280, and switch 254 connects busbar 234 to a positive terminal of vehicle load 280.

Battery module 210 may, in some embodiments, include submodules 202, 204, 206, and 208 which may also be referred to as cells. Likewise, battery module 211 may also, in some embodiments, include submodules 203, 205, 207, and 209 which may also be referred to as cells. For example, battery module 210 may be referred to as "a string of cells" (i.e., cells connected in series). The voltage of battery module 210 may be a combination of cells 202, 204, 206, and 208. For example, as shown illustratively in FIG. 2, the voltage of battery module 210 is a sum of the voltages of each of cells 202, 204, 206 and 208. In a further example, a battery module (e.g., battery module 210 or battery module 211) may include one or more cells connected in parallel (e.g., to increase current capacity of the battery module). For clarity, the present disclosure is described in terms of battery modules.

Arrangement 200 illustrates two battery modules for simplicity, but more than two battery modules may be managed in accordance with the present disclosure. For example, three battery modules each operating at 300 V may be connected using a switch configuration in parallel (e.g., charged at 300 V) or series (e.g., charged at 900 V). In a further example, three battery modules each operating at 450 V may be configured in parallel (e.g., charging at 450 v), or two of the three may be configured in parallel, and then in series with the third (e.g., to charge at 900V). Any suitable number of battery modules may be managed (e.g., connected with a switch configuration in series or parallel) in accordance with the present disclosure. It will be understood that a battery module may include one or more submodules (e.g., separate submodules which may be coupled together to form a module).

Figure 3:
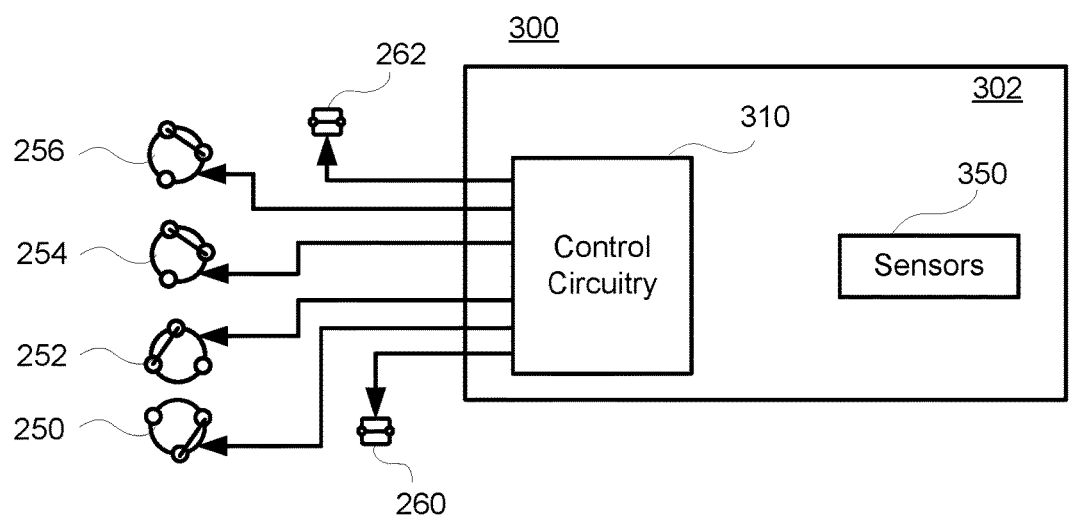
FIG. 3 shows a system diagram of illustrative control circuitry, electrical components, and sensors, in accordance with some embodiments of the present disclosure.

FIG. 3 shows a system diagram of illustrative control circuitry 310, electrical components, and sensors 350, in accordance with some embodiments of the present disclosure. In some embodiments, battery management module 302 may include control circuitry 310 and sensors 350. Battery management module 302 may be used to, for example, control the switches of FIG. 2. In some embodiments, battery management module 302, or control circuitry 310 thereof, may be incorporated in the arrangement 200 of FIG. 2, or charging arrangement 100 of FIG. 1. In some embodiments, battery management module 302 may include switches 250, 252, 254, 256, 260, and 262. As shown illustratively in arrangement 300, control circuitry 310 may be configured to control switches 250, 252, 254, 256, 260, and 262. For example, control circuitry 310 may place either, or both, of switches 260 and 262 in an OFF position or an ON position. In a further example, control circuitry 310 may place any of switches 250, 252, 254, and 256 into one of two ON positions, or an OFF position.

Control circuitry 310 may include a processor, a power supply, power management components (e.g., relays, filters, voltage regulators), input/output IO (e.g., GPIO, analog, digital), memory, communications equipment (e.g., CAN-bus hardware, Modbus hardware, or a WiFi module), any other suitable components, or any combination thereof. In some embodiments, control circuitry 310 may include one or more microprocessors, microcontrollers, digital signal processors, programmable logic devices, field-programmable gate arrays (FPGAs), application-specific integrated circuits (ASICs), etc., and may include a multi-core processor. In some embodiments, control circuitry 310 may be distributed across multiple separate processors or processing units, for example, multiple of the same type of processing units or multiple different processors.

In some embodiments, control circuitry 310 executes instructions for a battery management module stored in memory. Memory may be an electronic storage device that is part of control circuitry 310. For example, memory may be configured to store electronic data, computer software, or firmware, and may include random-access memory, read-only memory, hard drives, optical drives, solid state devices, or any other suitable fixed or removable storage devices, and/or any combination of the same. Nonvolatile memory may also be used (e.g., to launch a boot-up routine and other instructions).

Control circuitry 310 may be coupled to switches 250, 252, 254, 256, 260, and 262 using any suitable wired, or non-wired, coupling. For example, control circuitry 310 may be coupled to switches 250, 252, 254, 256, 260, and 262 using suitable cables, having any suitable terminations (e.g., plugs, screw down terminals, soldered connections). In a further example, control circuitry 310 may communicate wirelessly (e.g., using WiFi, or Bluetooth) with switches 250, 252, 254, 256, 260, and 262, which may each include a transceiver to receive communication and actuate the corresponding switch (e.g., which may also include a power supply).

In some embodiments, battery management module may process signals from one or more of sensors 350 which may be, but need not be, included in battery management module 302. Sensors 350 may include sensors for sensing voltage, current, impedance, temperature, any other suitable parameter, or any combination of parameters. For example, sensors 350 may include respective voltage sensors for each of battery modules 210 and 211, measured across suitable terminals. In a further example, sensors 350 may include a temperature sensor coupled to battery module 210 (e.g., to determine if battery module 210 is overheating). In some embodiments, sensors 350 may be included in any or all of switches 250, 252, 254, 256, 260, and 262. For example, switch 250 may be a SPDT relay, and sensors 350 may include additional switched terminals for determining the position of switch 250 (e.g., using a lower voltage/power circuit).

Figure 4:
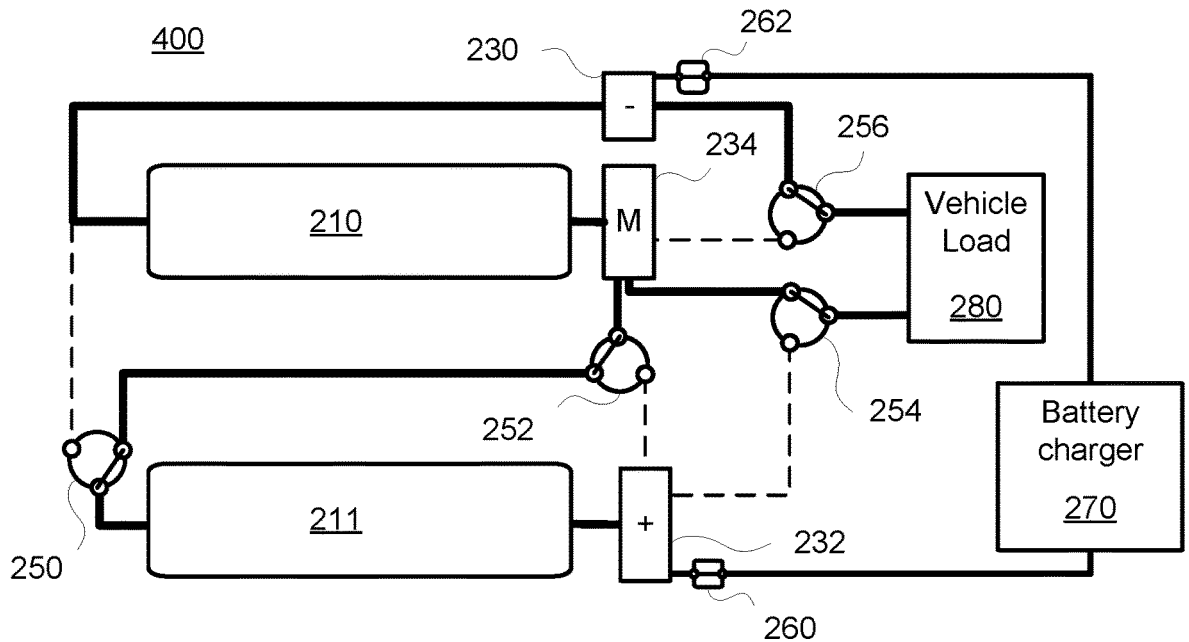
FIG. 4 shows a system diagram of an illustrative arrangement of battery modules, electrical components, and subsystems, during fast charge, in accordance with some embodiments of the present disclosure.
Figure 5:
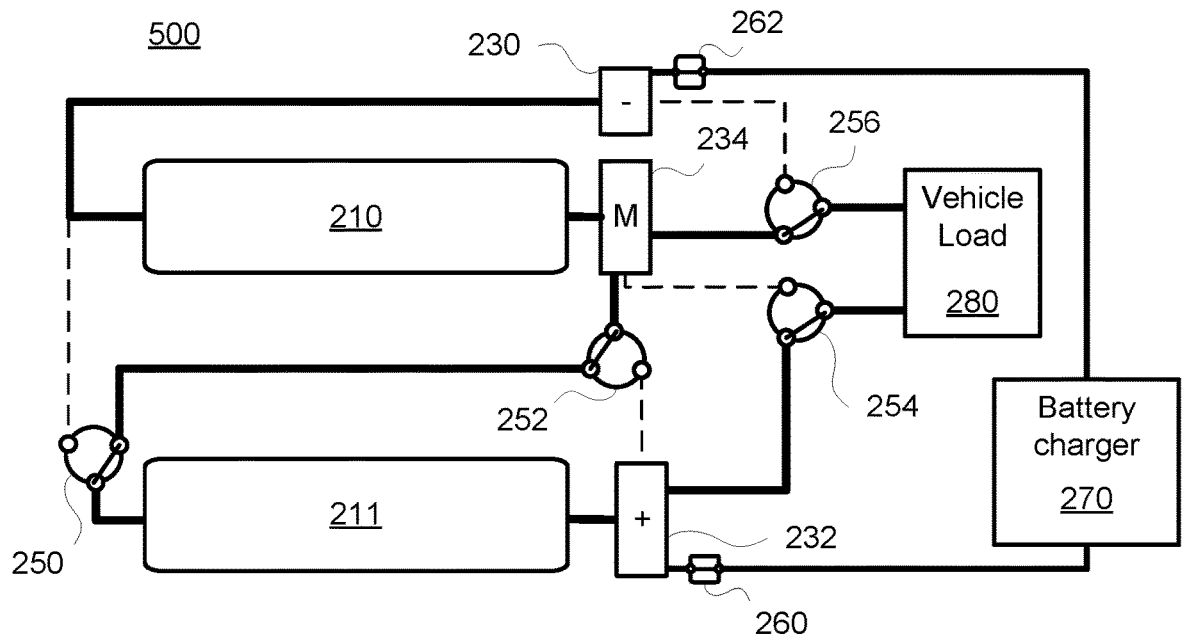
FIG. 5 shows a system diagram of an illustrative arrangement of battery modules, electrical components, and subsystems, during fast charge, in accordance with some embodiments of the present disclosure.
Figure 6:
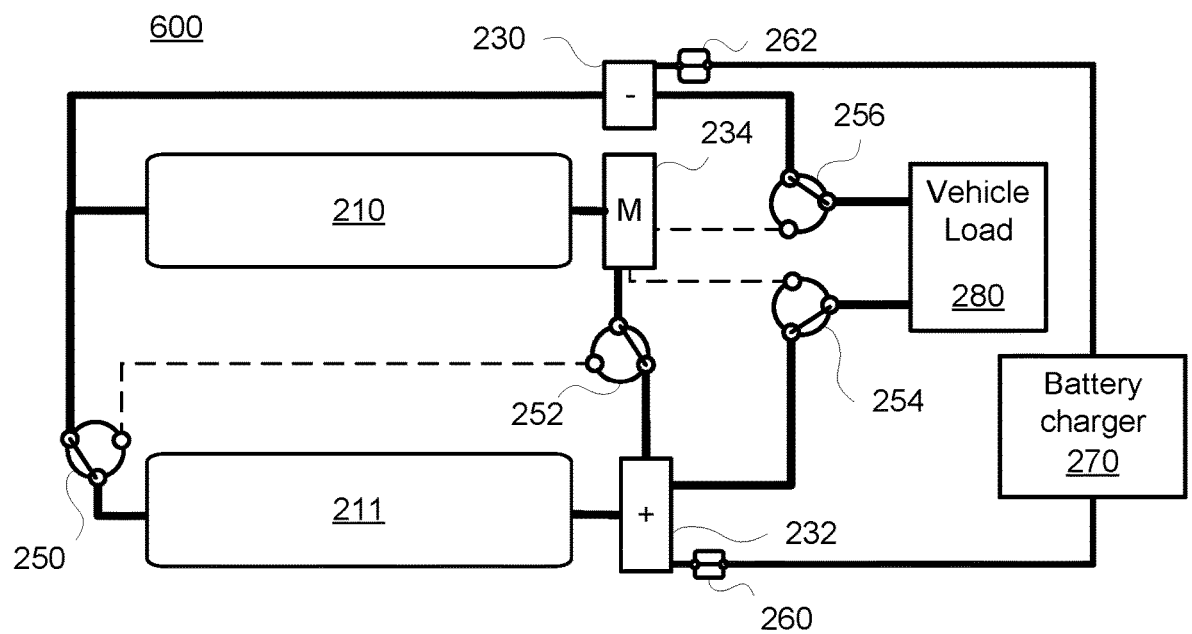
FIG. 6 shows a system diagram of an illustrative arrangement of battery modules, electrical components, and subsystems, in accordance with some embodiments of the present disclosure.

FIGS. 4-6 show system diagrams of respective illustrative arrangements 400, 500, and 600 of battery modules 210 and 211, electrical components, and subsystems, in accordance with some embodiments of the present disclosure. Arrangements 400, 500, and 600 differ by the respective switch configuration of switches 250, 252, 254, and 256. Switches 260 and 262, as shown in FIGS. 4-6, are in the closed (i.e., on) position (e.g., a charging configuration). For example, each of battery module 210 and battery module 211 may operate nominally at 450 V. In a further example, battery charger 270 may be configured to charge, at least, at both 450 V and 900 V.

Arrangement 400 includes battery modules 210 and 211 connected in series by the configuration of switches 250 and 252. Arrangement 400 also includes terminals of vehicle load 280 connected to corresponding terminals of battery module 210 (e.g., at busbars 230 and 234). Accordingly, vehicle load 280 is not connected to battery module 211 in arrangement 400.

Arrangement 500 includes battery modules 210 and 211 connected in series by the configuration of switches 250 and 252. Arrangement 500 also includes terminals of vehicle load 280 connected to corresponding terminals of battery module 211 (e.g., at busbars 234 and 232). Accordingly, vehicle load 280 is not connected to battery module 210 in arrangement 500.

Arrangement 600 includes battery modules 210 and 211 connected in parallel by the configuration of switches 250 and 252. Arrangement 600 also includes terminals of vehicle load 280 connected to corresponding terminals of both battery modules 210 and 211 (e.g., at busbars 230 and 232). In this arrangement, vehicle load 280 is also connected in parallel to corresponding terminals of battery charger 270.

Referencing arrangements 400, 500, and 600 of FIGS. 4-6, switches 250, 252, 254, and 256 may be used to adapt to two different charging settings of battery charger 270, as well as apply vehicle loads to either, or both, of battery modules 210 and 211. Additionally, switches 260 and 262 may be used to connect and disconnect battery charger 270 from busbars 232 and 230, respectively.

In a first circumstance (e.g., a fast charge configuration, or a high voltage configuration), battery charger 270 may be configured to charge at 900 V, and battery module 210, battery module 211, and vehicle load 280 may be configured to operate at 450 V (e.g., nominally half of 900 V). Accordingly, battery charger 270 should not be connected directly to vehicle load 280, nor either of battery modules 210 or 211 directly. In such circumstances, switches 250 and 252 may be placed in a first configuration, as shown in arrangements 400 and 500, to connect battery modules 210 and 211 in series. Accordingly, the total voltage between busbars 230 and 232 may then be nominally 900 V, allowing connection to battery charger 270. In the first circumstance, switches 254 and 256 may be configured to connect vehicle load 280 across either battery module 210 or battery module 211, but not both. Arrangements 400 and 500 illustrate two different settings of the first circumstance.

In a second circumstance (e.g., a slow charge configuration, or a low voltage configuration), battery charger 270 may be configured to charge at 450 V, and battery module 210, battery module 211, and vehicle load 280 may also be configured to operate at 450 V (e.g., the same as the charging voltage of battery charger 270). Accordingly, battery charger 270 may be connected directly to vehicle load 280, and either, or both, of battery modules 210 or 211 directly. In the second circumstance, switches 250 and 252 may be placed in a second configuration, as shown in arrangement 600 of FIG. 6, to connect battery modules 210 and 211 in parallel. Accordingly, the total voltage between busbars 230 and 232 may then be nominally 450 V, allowing connection to battery charger 270. In the second circumstance, switches 254 and 256 may be configured to connect vehicle load 280 across both battery modules 210 and 211 and thus also in parallel with battery charger 270. Arrangement 600 illustrates the second circumstance.

Referencing arrangements 400, 500, and 600, a battery management module may include control circuitry for configuring switches 250, 252, 254, 256, 260, and 262. For example, if fast charging is desired and battery module 210 has a slightly larger voltage than battery module 211, the battery management module may configure switches 250, 252, 254, 256, 260, and 262 to achieve arrangement 400 in order to balance the charging of the two battery modules. In a further example, if slow charging is desired, and both battery module 210 and battery module 211 are functional, the battery management module may configure switches 250, 252, 254, 256, 260, and 262 to achieve arrangement 600.

Figure 7:
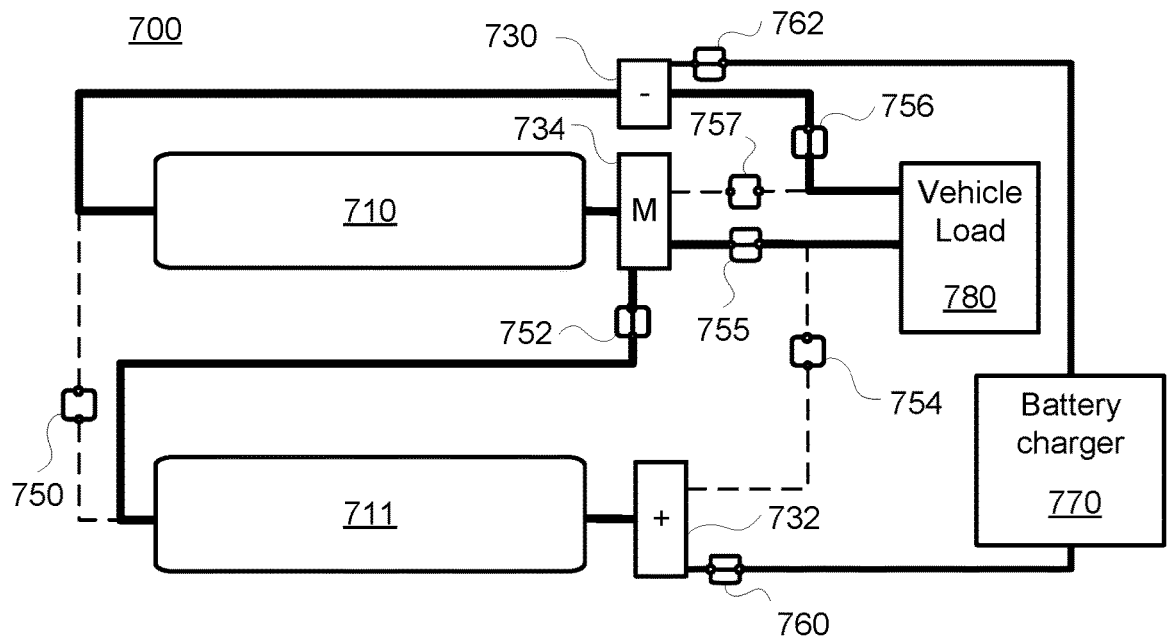
FIG. 7 shows a system diagram of an illustrative arrangement of battery modules, electrical components, and subsystems, during fast charge, in accordance with some embodiments of the present disclosure.
Figure 8:
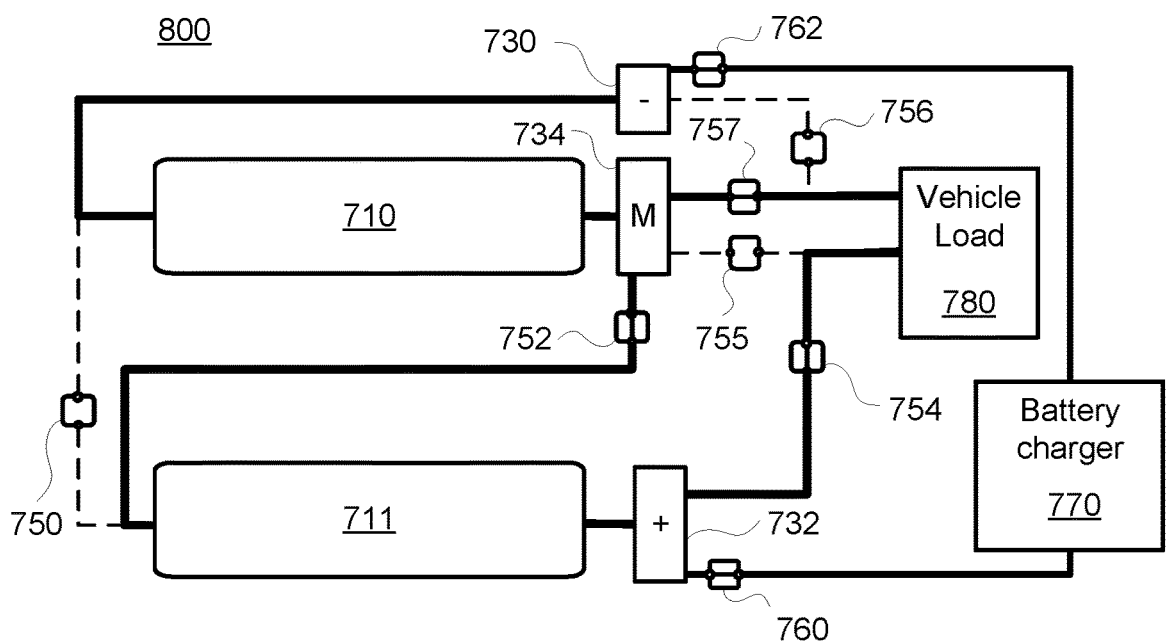
FIG. 8 shows a system diagram of an illustrative arrangement of battery modules, electrical components, and subsystems, during fast charge, in accordance with some embodiments of the present disclosure.
Figure 9:
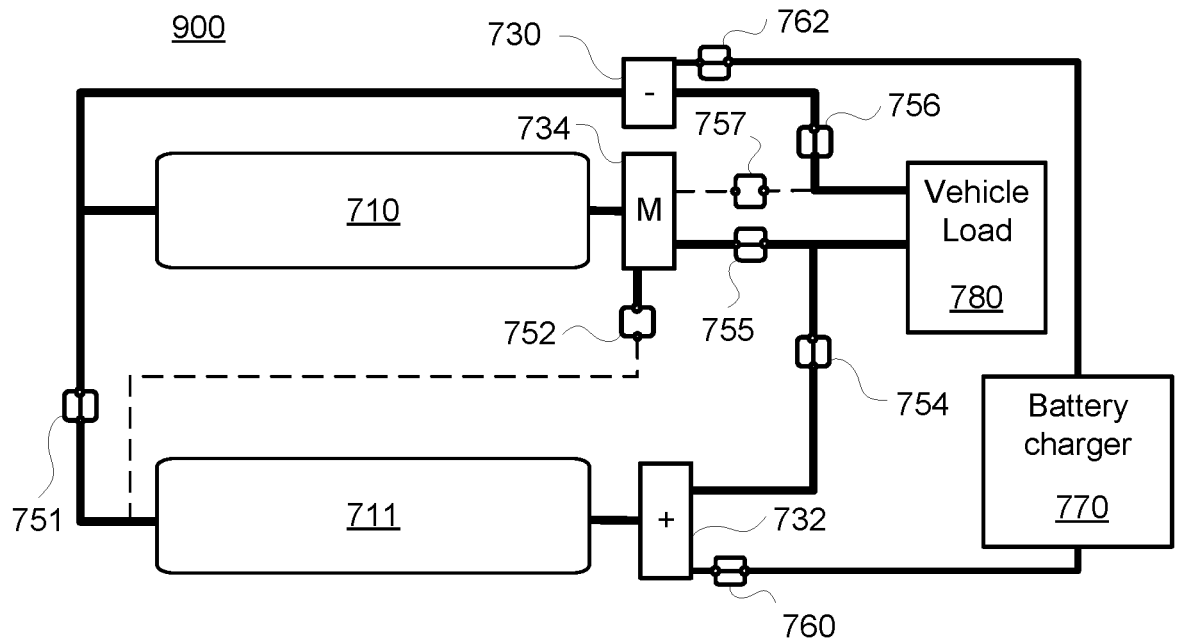
FIG. 9 shows a system diagram of an illustrative arrangement of battery modules, electrical components, and subsystems, in accordance with some embodiments of the present disclosure.

FIGS. 7-9 show system diagrams of respective illustrative arrangements 700, 800, and 900 of battery modules 710 and 711, electrical components, and subsystems, in accordance with some embodiments of the present disclosure. Arrangements 700, 800, and 900 differ by the respective switch configuration of switches 750, 752, 754, 755, 756, and 757. Switches 760 and 762, as shown in FIGS. 7-9, remain in the closed (i.e., on) position (e.g., a charging configuration). For example, each of battery module 710 and battery module 711 may operate nominally at 450 V. In a further example, battery charger 770 may be configured to charge, at least, at both 450 V and 900 V.

Arrangement 700 includes battery modules 710 and 711 connected in series by the configuration of switches 750, 752, 754, 755, 756 and 757. Arrangement 700 also includes terminals of vehicle load 780 connected to corresponding terminals of battery module 710 (e.g., at busbars 730 and 734). Accordingly, vehicle load 780 is not connected to battery module 711 in arrangement 700.

Arrangement 800 includes battery modules 710 and 711 connected in series by the configuration of switches 750, 752, 754, 755, 756 and 757. Arrangement 800 also includes terminals of vehicle load 780 connected to corresponding terminals of battery module 711 (e.g., at busbars 734 and 732). Accordingly, vehicle load 780 is not connected to battery module 710 in arrangement 800.

Arrangement 900 includes battery modules 710 and 711 connected in parallel by the configuration of switches 750, 752, 754, 755, 756 and 757. Arrangement 900 also includes terminals of vehicle load 780 connected to corresponding terminals of both battery modules 710 and 711 (e.g., at busbars 730 and 732). In this arrangement, vehicle load 780 is also connected to corresponding terminals of battery charger 770.

Referencing arrangements 700, 800, and 900 of FIGS. 7-9, switches 750, 752, 754, 755, 756, and 757 may be used to adapt to two different charging settings of battery charger 770 (e.g., fast charge or slow charge), as well as apply vehicle loads to either, or both, of battery modules 710 and 711 (e.g., as shown in FIGS. 7-8). Additionally, switches 760 and 762 may be used to connect and disconnect battery charger 770 from busbars 732 and 730, respectively.

In a first circumstance (e.g., a fast charge configuration, or a high voltage configuration), battery charger 770 may be configured to charge at 900 V, and battery module 710, battery module 711, and vehicle load 780 may be configured to operate at 450 V (e.g., nominally half of 900 V). Accordingly, battery charger 770 should not be connected directly to vehicle load 780, nor either of battery modules 710 or 711 directly. In such a circumstance, switches 750 and 752 may be placed in a first configuration, as shown in arrangements 700 and 800, to connect battery modules 710 and 711 in series. Accordingly, the total voltage between busbars 730 and 732 may then be nominally 900 V, allowing connection to battery charger 770. In the first circumstance, switches 754, 755, 756, and 757 may be configured to connect vehicle load 780 across either battery module 710 or battery module 711, but not both. Arrangements 700 and 800 illustrate the first circumstance.

In a second circumstance (e.g., a slow charge configuration, or a low voltage configuration), battery charger 770 may be configured to charge at 450 V, and battery module 710, battery module 711, and vehicle load 780 may also be configured to operate at 450 V (e.g., the same as the charging voltage of battery charger 770). Accordingly, battery charger 770 may be connected directly to vehicle load 780, and either, or both, of battery modules 710 or 711 directly. In the second circumstance, switches 750 and 752 may be placed in a second configuration, as shown in arrangement 900, to connect battery modules 710 and 711 in parallel. Accordingly, the total voltage between busbars 730 and 732 may then be nominally 450 V, allowing connection to battery charger 770. In the second circumstance, switches 754, 755, 756, and 757 may be configured to connect vehicle load 780 across both battery modules 710 and 711. Arrangement 900 illustrates the second circumstance.

Referencing arrangements 700, 800, and 900, a battery management module may include control circuitry for configuring switches 750, 752, 754, 755, 756, 757, 760, and 762. For example, if fast charging is desired and battery module 710 has a slightly larger voltage than battery module 711, the battery management module may configure switches 750, 752, 754, 755, 756, 757, 760, and 762 to achieve arrangement 700 in order to balance charging of the two battery modules. In a further example, if slow charging is desired, and both battery module 710 and battery module 711 are functional, the battery management module may configure switches 750, 752, 754, 755, 756, 757, 760, and 762 to achieve arrangement 900.

Figure 10:
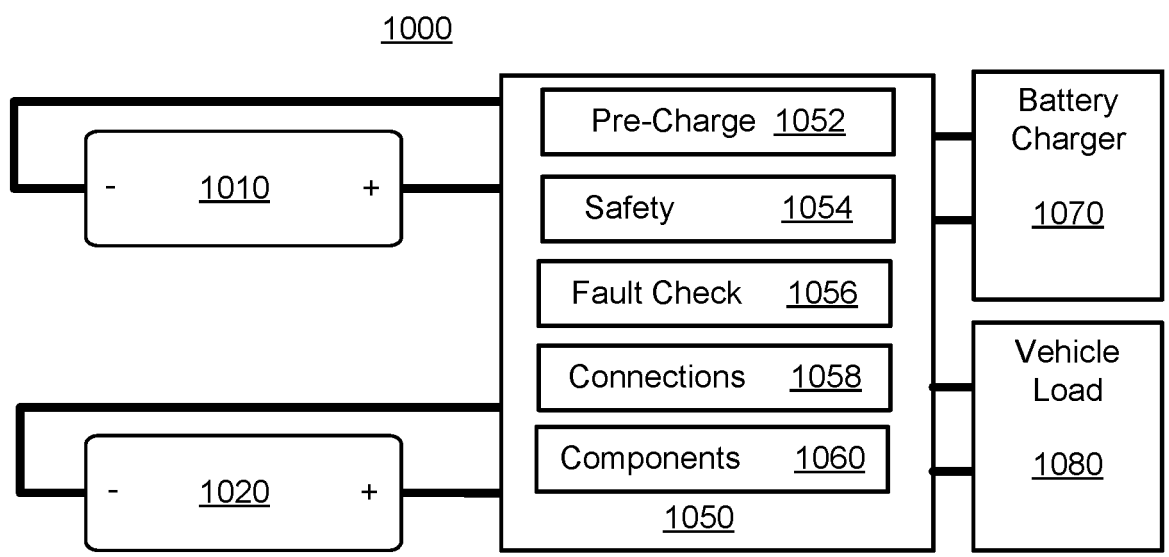
FIG. 10 shows a system diagram of an illustrative battery management module for managing battery power and charging, in accordance with some embodiments of the present disclosure.

FIG. 10 shows a system diagram of illustrative arrangement 1000, including battery management module 1050, for managing battery power and charging, in accordance with some embodiments of the present disclosure. Arrangement 1000 may show, for example, arrangements in which battery modules 1010 and 1020 each have a positive terminal and a negative terminal, which are all coupled to battery management module 1050. Battery management module 1050 may include any suitable control circuitry to control, start, stop, limit, characterize (e.g., measure), check, or otherwise manage charging of battery modules 1010 and 1020. In an illustrative example, arrangement 1000 may apply to any of the arrangements shown in FIGS. 4-9. Further, arrangement 1050 may be implemented as part of any of the systems of FIGS. 1-9.

Battery management module 1050 may include pre-charge system 1052, safety system 1054, fault check system 1056, electrical connections 1058, electrical components 1060, any other suitable systems or components, or any combination thereof. For example, battery management module 1050 may include any or all of bus bars, terminal blocks, fuses, switches (e.g., relays, or contactors), breakers, electrical filters (e.g., to reduce noise), capacitors (e.g., for pre-charging), resistors (e.g., for pre-charging), diodes, inductors (e.g., a choke), processing equipment, measurement equipment (e.g., current sensors, voltage sensors), IO hardware (e.g., an RJ45 jack and ethernet controller), and memory. In some embodiments (e.g., as shown in FIG. 10), battery management module 1050 may be coupled to battery charger 1070 (e.g., to receive charge), and coupled to vehicle load 1080 (e.g., including any other subsystem of electrical vehicle subsystems 130). Accordingly, battery management module 1050 may manage interactions of battery modules 1010 and 1020 with battery charger 1070, and vehicle load 1080.

Pre-charge system 1052 may include electric circuitry for reducing a potential difference (i.e., a voltage difference) across connections of a switch (e.g., to reduce in-rush current). For example, pre-charge system 1052 may include capacitors and resistors to control current and voltage across switch terminals.

Safety system 1054 may include, for example, circuitry for monitoring a proximity pilot (e.g., to identify a connector state), circuitry for measuring a parameter (e.g., voltage, current, temperature, resistance), circuitry for communicating with any of electric vehicle subsystems 130, any other suitable circuitry, or any combination thereof. In some embodiments, battery management module 1050 may use safety system 1054 to determine a switch configuration to use. For example, if safety system 1054 determines that an unsafe condition is occurring, the battery management module may determine a switch configuration that isolates, or otherwise disconnects, one or more of battery charger 1070, vehicle load 1080, and battery modules 1010 and 1020.

Fault check system 1056 may include, for example, circuitry for measuring a parameter (e.g., voltage across a battery module, a charging current, a battery module temperature, a resistance across suitable terminals), circuitry for communicating with on-board charger 146, any other suitable circuitry, or any combination thereof. In some embodiments, fault check system 1056 may be included in safety system 1054. In some embodiments, safety system 1054 may be included in fault check system 1056. In some embodiments, the battery management module may determine a fault has occurred based on fault check system 1056.

Connections 1058 may include, for example, busbars, breakouts, connectors, terminals, any other suitable components for connecting charging conductors, or any combination thereof. For example, connections 1058 may include high voltage DC connectors, crimped cable connections, soldered or brazed connections, screw-down terminals, spring loaded terminals, grounding terminals, any other suitable connections, or any combination thereof.

Components 1060 may include, for example, filters, resistors, capacitors, inductors, diodes, amplifiers, contactors, relays, any other suitable components for managing charging of one or more battery modules. In an illustrative example, a combination of connections 1058 and components 1060 may be control circuitry for applying a switch configuration to one or more switches.

In some embodiments, for example, battery management module 1050 may include control circuitry (e.g., control circuitry 310 of FIG. 3), and sensors (e.g., sensors 350 of FIG. 3). In some embodiments, battery management module 1050 may be part of, or combined with, an on-board charger (e.g., on board charger 146 of FIG. 1).

Figure 11:
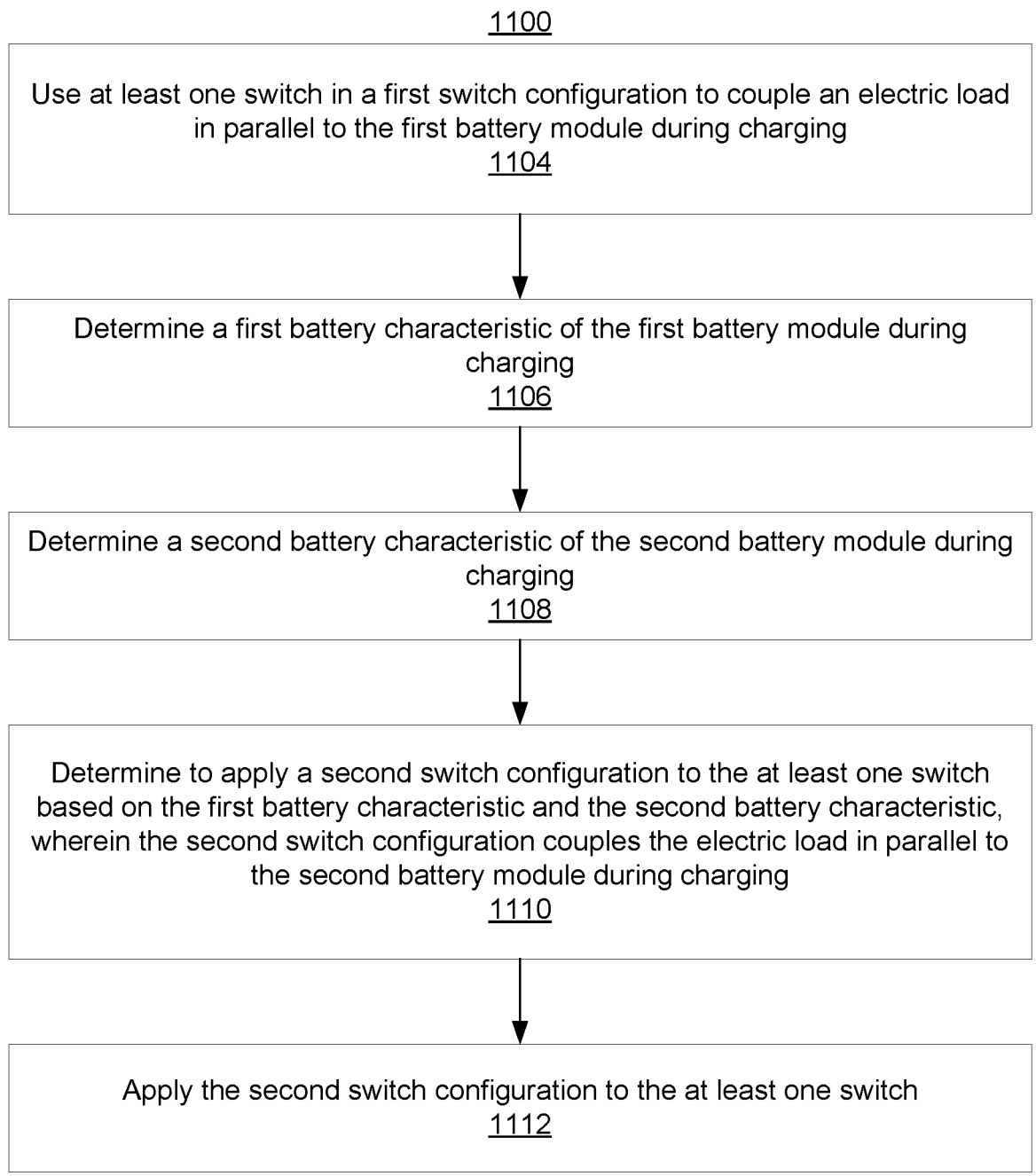
FIG. 11 is a flowchart of an illustrative process for managing battery charging, in accordance with some embodiments of the present disclosure.

A battery management module may manage operation and charging of a battery pack having two or more battery modules. In order to balance utilization, and take advantage of fast charging when desired, the battery management module may determine and apply a switch configuration to manage charging. For example, the battery management module may manage providing power to an electric load during low voltage charging, by managing which battery module provides the power. In a further example, the battery management module may manage switching the electric load between the battery modules to balance utilization. FIG. 11 is a flowchart of an illustrative process 1100 for managing charging of a battery pack, in accordance with some embodiments of the present disclosure. It should be noted that process 1100 or any step thereof could be performed on, or provided by, any of the systems shown in FIGS. 1-10. In addition, one or more steps of process 1100 may be incorporated into or combined with one or more steps of any other processes or embodiments described herein. In some embodiments, process 1100 may include a battery management module managing charging of a first battery module and a second battery module that are coupled in series. In some embodiments, the battery management module may be coupled to a battery charger, which may provide a charging current, at a charging voltage, to the battery management module. In some embodiments, charging the first and second battery modules while connected in series may correspond to a fast charge.

Step 1104 may include a battery management module using at least one switch in a first switch configuration to couple an electric load in parallel to the first battery module during charging. In some embodiments, the at least one switch may include a plurality of switches configured to couple an electric load in parallel to the first battery module during charging. For example, referencing arrangement 200 of FIG. 2, switches 256 and 254 are in a configuration to couple vehicle load 280 (e.g., an electric load) to battery module 210 (e.g., a first module). In a further example, referencing arrangement 800 of FIG. 8, switches 754, 755, 756, and 757 are in a configuration to couple vehicle load 780 (e.g., an electric load) to battery module 711 (e.g., a first module).

Step 1106 may include a battery management module determining a first battery characteristic of the first battery module during charging. In some embodiments, the first battery characteristic may be a numerical value such as, for example, a measurement (e.g., voltage across the first battery module), a time duration, a charging start time, or other suitable value. In some embodiments, the first battery characteristic may be a state (e.g., a status identifier) such as, for example, "fully charged," "voltage high," "voltage low," or other suitable state. In a further example, a battery management module may determine an elapsed time since last charge, an elapsed time since last loading, a total number of charges, a cumulative charging time, any other suitable metric associated with historical charging behavior, or any combination thereof.

Step 1108 may include a battery management module determining a second battery characteristic of the second battery module during charging. In some embodiments, the second battery characteristic may be a numerical value such as, for example, a measurement (e.g., voltage across the first battery module), a time duration, a charging start time, or other suitable value. In some embodiments, the second battery characteristic may be a state (e.g., a status identifier) such as, for example, "fully charged," "voltage high," "voltage low," "charging time reached," or other suitable state. In a further example, a battery management module may determine an elapsed time since last charge, an elapsed time since last loading, a total number of charges, a cumulative charging time, any other suitable metric associated with historical charging behavior, or any combination thereof.

It will be understood that steps 1106 and 1108 may be combined in any suitable way. In some embodiments, a battery management module may determine a differential battery characteristic from a comparison of the two battery modules. For example, a battery management module may determine a difference in voltage across the first battery module and the second battery module. To illustrate, if the voltage across the first battery module is 440 V, and the voltage across the second battery module is 452 V, the battery management module may determine a voltage difference of 12 V, or −12 V, depending on how the difference is determined. In some embodiments, a battery management module may determine the second battery characteristic based at least in part on the first battery characteristic. For example, a battery management module may determine that a first battery characteristic is 452 V (e.g., the voltage across the first battery module is 452 V). The battery management module may then determine a second battery characteristic is −6 V (e.g., the voltage across the second battery module is 446 V, or 6V less than the first battery module).

Step 1110 may include a battery management module determining to apply a second switch configuration to the at least one switch based on the first battery characteristic and the second battery characteristic, wherein the second switch configuration couples the electric load in parallel to the second battery module during charging. In some embodiments, the battery management module may select from among a group of switch configurations. For example, a group of pre-determined switch configurations may be selected from, each describing one or more switch positions to be used in a particular circumstance. In some embodiments, the battery management module may determine to apply a switch configuration based on a subset of one or more switches. For example, the battery module may determine to apply a switch configuration by determining a load switch configuration (e.g., for switches 254 and 256 of FIGS. 4-6), a charge switch configuration (e.g., for switches 260 and 262 of FIGS. 4-6), and a mode switch configuration (e.g., switches 250 and 252 of FIGS. 4-6).

Step 1112 may include a battery management module applying the second switch configuration (e.g., of step 1110) to the at least one switch. In some embodiments, step 1112 may include a battery management module sending one or more signals to one or more corresponding switches to change a switch position. For example, the battery management module may send a transistor-transistor level (TTL) signal to a relay or contactor to change position. In a further example, the battery management module may send a DC signal (e.g., 5 V, 12 V, 24 V, or other voltage) to one or more relays or contactors to change position. In a further example, the battery management module may send an AC signal (e.g., 110 VAC, 24 VAC, or other voltage) to one or more relays or contactors to change position. In a further example, the battery management module may send a command over a CANbus to relays or contactors (e.g., which may include control circuitry) to change position. In some embodiments, step 1112 may include a battery management module not changing one or more switches. For example, one or more switches may remain in a position when changing the coupling of the electric load from the first battery module to the second battery module.

It is contemplated that the steps or descriptions of FIG. 11 may be used with any other embodiments of this disclosure. In addition, the steps and descriptions described in relation to FIG. 11 may be done in alternative orders or in parallel to further the purposes of this disclosure. For example, battery characteristics may also be determined and used to determine the switch configuration used in step 1104. As another example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 1-10 could be used, alone or in concert, to perform one or more of the steps in FIG. 11.

A battery management module may manage a fault occurrence of a battery pack having two or more battery modules. In order to prevent damage or unsafe conditions, the battery management module may determine a fault has occurred and apply a switch configuration to manage operation, charging, or both in view of the fault. For example, the battery management module may disconnect a battery module from an electric load to prevent an operating voltage from deviating from an acceptable range (e.g., an electric short may cause a voltage drop below a threshold). FIG. 12 is a flowchart of an illustrative process 1200 for managing a fault, in accordance with some embodiments of the present disclosure. It should be noted that process 1200 or any step thereof could be performed on, or provided by, any of the devices shown in FIGS. 1-10. In addition, one or more steps of process 1200 may be incorporated into or combined with one or more steps of any other processes or embodiments described herein.

Referencing FIG. 6, for example, battery module 211 may have a fault such as a short. Accordingly, the voltage across battery module 211 may drop which may damage, or otherwise render unusable, vehicle load 280. The battery management module may open (e.g., set to OFF position), switches 250, 252, 260, and 262, and position switch 256 to connect busbar 230 to vehicle load 280 and position switch 254 to connect busbar 234 to vehicle load 280. This switch configuration isolates battery module 211, and allows vehicle load 280 to be powered by battery module 210, at the same operating voltage, albeit with less current capacity (e.g., without battery module 211 in parallel). Referencing FIG. 4, if battery module 211 exhibited a fault in arrangement 400, the battery management module, may first apply a switch configuration to achieve arrangement 600 of FIG. 6, and then perform the above switch configuration described above to isolate battery module 211. In some embodiments, if the battery management module identifies a fault during slow charging, it may isolate the faulted battery module, while still powering a vehicle load. In some embodiments, if the battery management module identifies a fault during fast charge, it may shut down charging and disconnect a vehicle load. In some embodiment, if the battery management module identifies a fault during fast charge, it may switch to slow charge and isolate the faulted battery module.

Step 1202 may include a battery management module identifying, with control circuitry, a fault occurrence in a battery module of a plurality of battery modules while the at least one switch is in a first switch configuration. In some circumstances, the at least one switch in the first switch configuration couples the plurality of battery modules in parallel with each other and with an electric load. A fault is an event, or otherwise change in state, of a battery module, associated components, or both that negatively impacts operation or charging of the battery module. A fault occurrence refers to either the occurrence of the fault itself, or the time when the battery management module identifies that a fault has occurred. In some embodiments, the battery management module may scan (e.g., periodically test or measure) respective battery characteristics for one or more battery modules to check for faults. In some embodiments, the battery management module may continuously monitor respective battery characteristics for one or more battery modules to check for faults.

In some embodiments, the battery management module may identify a fault occurrence at step 1202 based on at least one sensor configured to measure temperature (e.g., thermocouples, thermistors, or resistance temperature detectors). For example, the battery management module may include a thermocouple interface, coupled to a thermocouple, which may measure a battery module temperature. If the temperature increases (e.g., above a threshold), the battery management module may determine that a fault has occurred (e.g., an increased temperature may signal a fault).

In some embodiments, the battery management module may identify a fault occurrence at step 1202 based on at least one sensor configured to measure voltage (e.g., a digital multimeter, or GPIO with a voltage divider circuit). For example, the battery management module may measure a battery module voltage. If the voltage is outside of a range, the battery management module may determine that a fault has occurred (e.g., a short or open circuit has occurred). In some embodiments, the battery management module may interrupt current flow in a battery module to measure an open circuit voltage (e.g., over a short time period as to not be significantly noticeable to an electric load).

In some embodiments, the battery management module may identify a fault occurrence at step 1202 based on at least one sensor configured to measure current (e.g., a digital multimeter, precision resistor, or a current shunt). For example, the battery management module may measure a battery module charging current or load current. If the current is outside of a range, the battery management module may determine that a fault has occurred (e.g., a short or open circuit has occurred). In some embodiments, the battery management module may interrupt a circuit in a battery module to check that the current flow is zero (e.g., to check for shorts, or undesired grounding).

In some embodiments, the battery management module may identify a fault occurrence at step 1202 based on at least one sensor configured to measure impedance (e.g., a digital multimeter, passive circuit components). For example, the battery management module may measure a battery module impedance by providing a signal modulation and measuring a voltage response. If the impedance is outside of a range, the battery management module may determine that a fault has occurred (e.g., the circuit has undergone a change). In some embodiments, the battery management module may interrupt a circuit in a battery module to check that impedance of a battery module.

Step 1204 may include a battery management module determining a second switch configuration in response to identifying the fault occurrence in the one battery module. In some embodiments, the battery management module may determine a second switch configuration that isolates, disconnects, or otherwise lessens the impact of, the fault occurrence on battery charging. In some embodiments, the battery management module may stop charging (e.g., apply an OFF position to switches 260 and 262 of FIGS. 4-6) when a fault occurrence is identified. In some embodiments, the battery management module may select from among a group of switch configurations. For example, one switch configuration from a group of pre-determined switch configurations may be selected, each describing one or more switch positions to be applied when a fault is identified. In some embodiments, the battery management module may determine to apply a switch configuration based on a subset of one or more switches. For example, the battery module may determine to apply a switch configuration by determining a load switch configuration (e.g., for switches 254 and 256 of FIGS. 4-6), a charge switch configuration (e.g., for switches 260 and 262 of FIGS. 4-6), and a mode switch configuration (e.g., switches 250 and 252 of FIGS. 4-6).

In some embodiments, the battery management module may periodically disconnect each battery module to measure an open circuit voltage across the battery module. For example, the battery management module may disconnect each battery module for a pre-determined time period (e.g., 10 milliseconds, or any other suitable time sufficient to reach near open circuit voltage and perform a measurement). If the battery management module identifies a low voltage (e.g., below a threshold), the battery management module may identify that a fault has occurred in that battery module. The battery management module may accordingly disconnect the faulted battery module from the load (e.g., apply an OFF position to switch 250 of FIG. 2), disconnect the battery charger from the battery modules (e.g., using switches 260 and 262 of FIGS. 4-6), disconnect the electric load from the battery module (e.g., using switches 254 and 256 of FIGS. 4-6), or a combination thereof.

Step 1206 may include a battery management module applying the second switch configuration to the at least one switch. In some circumstances, the at least one switch in the second switch configuration de-couples the battery module having the fault occurrence from the electric load and couples the remaining one or more of the plurality of battery modules not having the fault occurrence to the electric load. Accordingly, the resulting arrangement may include the electric load coupled to the remaining one or more battery modules (e.g., still capable of providing current at an operating voltage), and the faulted battery module may be de-coupled by disconnecting one, or both, terminals of the battery module, any corresponding circuitry, or any combination thereof.

In an illustrative example, referencing arrangement 600 of FIG. 6, Table 1 shows an illustrative switch configuration (i.e., battery modules 210 and 211 in parallel, connected to electric load 250). With switches 260 and 262 either open (e.g., not charging, or not connected to a battery charger, as shown in Table 1) or closed (e.g., charging), the battery management module may identify that battery module 211 has a fault occurrence at step 1202. At step 1204, the battery management module may determine the switch configuration of Table 2 as the desired switch configuration when a fault is detected in battery module 211 and when not charging (e.g., in response to the fault occurrence).

TABLE 1

| Illustrative switch configuration pre-fault (e.g., as shown in FIG. 6) | |
|---|---|
| Switch ID | Configuration |
| Switch 250 | Connect 211(−) to 210(−) |
| Switch 252 | Connect 211(+) to 210(+) |

TABLE 1-continued

| Illustrative switch configuration pre-fault (e.g., as shown in FIG. 6) | |
|---|---|
| Switch ID | Configuration |
| Switch 254 | Connect 250 to 211(+) |
| Switch 256 | Connect 250 to 210(−) |
| Switch 260 | OPEN |
| Switch 262 | OPEN |

TABLE 2

| Illustrative switch configuration post-fault. | |
|---|---|
| Switch ID | Configuration |
| Switch 250 | OFF position |
| Switch 252 | OFF position |
| Switch 254 | Connect 250 to 210(+) |
| Switch 256 | Connect 250 to 210(−) |
| Switch 260 | OPEN |
| Switch 262 | OPEN |

It is contemplated that the steps or descriptions of FIG. 12 may be used with any other embodiments of this disclosure. In addition, the steps and descriptions described in relation to FIG. 12 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the systems and corresponding components discussed in relation to FIGS. 1-10 could be used, alone or in concert, to perform one or more of the steps in FIG. 12.

A battery management module may manage charging of a battery pack based on capabilities, or limitations, of a battery charger. In order to take advantage of fast charging when desired or available, as well as determine an appropriate switch configuration in view of the coupled battery charger, the battery management module may determine and apply a switch configuration to manage charging. For example, the battery management module, an onboard charger, or both, may determine whether the battery charger can provide AC power, DC power, what voltages can be provided, what current limitations are in place, a charging time limit, or other battery charger capability information. FIG. 13 is a flowchart of an illustrative process 1300 for managing charging of a battery pack based on battery charger capability information, in accordance with some embodiments of the present disclosure. It should be noted that process 1300 or any step thereof could be performed on, or provided by, any of the systems shown in FIGS. 1-10. In addition, one or more steps of process 1300 may be incorporated into or combined with one or more steps of any other processes or embodiments described herein.

Step 1302 may include a battery management module receiving, using control circuitry, capability information from a battery charging system (e.g., a battery charger) coupled to the battery pack. In some embodiments, when a battery charger is coupled to one or more battery modules, the battery management module may communicate with the battery charger. For example, an electric vehicle may be coupled to a battery charger using a SAE J1772 type connector. A connector may include two or more pins for conducting charging current (e.g., pins for AC charging, pins for DC fast charging), a pin for grounding, one or more pins for communication, any other suitable pins, or any combination thereof. In some embodiments, an OBC may communicate with the battery charger, and communicate corresponding information to a battery management module. Capability information may include, for example, a charging rate, a voltage (e.g., a charging voltage), a current (e.g., a maximum charging current rating), a time (e.g., a limit in charging time), whether the battery charger is fast charge capable, any other suitable information about capabilities of the battery charger, or any combination thereof. The battery management module may receive capability information as an analog signal (e.g., a voltage), a digital signal (e.g., information on a series port), a modulated signal (e.g., a square wave on top of a DC signal or carrier wave), a message (e.g., from a TCP connection), any other suitable signal, or any combination thereof.

Step 1304 may include a battery management module determining whether the battery charging system is capable of fast charging based on the capability information. In some embodiments, the battery management module may receive capability information corresponding to a charging voltage. For example, the battery management module may receive capability information including 900 V as a maximum charging voltage. Accordingly, the battery management module may determine that the battery charger is capable of fast charging (e.g., charging at 900 V). In some embodiments, the battery management module may receive capability information corresponding to available states of the battery charger. For example, the battery management module may receive a signal corresponding to fast charge capable (e.g., an alphanumeric code, alphanumeric identifier, flag value, or other identifier).

Step 1306 may include a battery management module applying, using the control circuitry, a switch configuration to the at least one mode switch to perform fast charging in response to determining that the battery charging system is capable of fast charging. In some embodiments, step 1306 may include a battery management module sending one or more signals to one or more corresponding switches to change a switch position. For example, the battery management module may send TTL signals to relays or contactors to change position. In a further example, the battery management module may send a DC signal (e.g., 5 V, 12 V, 24 V, or other voltage) to one or more relays or contactors to change position. In a further example, the battery management module may send an AC signal (e.g., 110 VAC, 24 VAC, or other voltage) to one or more relays or contactors to change position. In a further example, the battery management module may send a command over a CANbus to relays or contactors (e.g., which may include control circuitry) to change position. In some embodiments, step 1306 may include a battery management module not changing one or more switches when a switch configuration is changed. For example, when applying the switch configuration, one or more switches may remain in a position when changing the coupling of the electric load from the first battery module to the second battery module. Referencing FIGS. 4 and 6, if the battery management module applies a switch configuration to change from arrangement 400 to arrangement 600, switches 256, 260, and 262 remain in the same position.

In an illustrative example, a battery management module may be capable of applying a first switch configuration that couples a first battery module and a second battery module in series, and a second switch configuration that couples a first battery module and a second battery module in parallel. At step 1302, the battery management module may receive information including available charging voltages and currents that can be delivered. At step 1304, the battery management module may determine that a battery charger is capable of fast charging (e.g., high voltage charging) based on the available voltages. At step 1306, the battery management module may apply a switch configuration similar to that of arrangement 400 of FIG. 4 to perform fast charging of the first and second battery modules.

It is contemplated that the steps or descriptions of FIG. 13 may be used with any other embodiments of this disclosure. In addition, the steps and descriptions described in relation to FIG. 13 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 1-10 could be used, alone or in concert, to perform one or more of the steps in FIG. 13.

A battery management module may manage charging of a battery pack based on battery charger capability information and local charging information. In order to balance utilization, and take advantage of fast charging when desired (or available), the battery management module may determine and apply a switch configuration to manage charging. For example, the battery management module may determine whether to connect battery modules in series or parallel, based on whether fast charge is available at the charger and whether fast charge is desired by a user or appropriate for the battery pack. FIG. 14 is a flowchart of an illustrative process 1400 for managing battery charging of a battery pack, based in part on local charging information, in accordance with some embodiments of the present disclosure. The battery pack may include, for example, a first battery module and a second battery module. It should be noted that process 1400 or any step thereof could be performed on, or provided by, any of the systems shown in FIGS. 1-10. In addition, one or more steps of process 1400 may be incorporated into or combined with one or more steps of any other processes or embodiments described herein.

Step 1404 may include a battery management module receiving, using control circuitry, battery charging system capability information from a battery charging system. In some embodiments, an OBC may communicate with the battery charger, and communicate corresponding information to the battery management module. Capability information may include, for example, a charging rate, a voltage (e.g., a charging voltage), a current (e.g., a maximum charging current rating), a time (e.g., a limit in charging time), whether the battery charger is fast charge capable, any other suitable information about capabilities of the battery charger, or any combination thereof. The battery management module may receive capability information as an analog signal (e.g., a voltage), a digital signal (e.g., information on a series port), a modulated signal (e.g., a square wave on top of a DC signal or carrier wave), a message (e.g., from a TCP connection), any other suitable signal, or any combination thereof.

In some embodiments, step 1404 may include the battery management module identifying, using control circuitry, that the battery charging system is coupled to the battery pack. For example, referencing FIG. 1, battery management module 138, alone or in combination with on-board charger 146, may identify that battery charger 110 is coupled to battery pack 122.

Step 1406 may include a battery management module retrieving local charging information regarding the battery pack. Local charging information may include, for example, an operating voltage of a battery pack, an operating voltage of a battery module, a maximum charging current, a desired charge mode (e.g., slow charge or fast charge), a desired charge voltage (e.g., low voltage or high voltage), a user preference, a state of one or more battery modules, historical charging information, location information, any other suitable information, or any combination thereof. For example, local charging information may include a user preference to select fast charging whenever available. In a further example, local charging information may include a selected option (e.g., by a user) as to whether to apply a fast charge or a slow charge. In a further example, local charging information may include a battery module operating voltage of 450 V. In a further example, local charging information may include a number fast charges that have been performed in a period of time (e.g., three fast charges in the last month, or ten fast charges in the life of the battery pack). In a further example, local charging information may include which battery module to couple to an electric load during charging.

In some embodiments, local charging information may include a location of a battery pack, a vehicle, or a user. For example, local charging information may include Global Positioning System (GPS) information, a set of coordinates, an address (e.g., a place of business, or a residence), a user-defined location (e.g., received as user input to a battery management module or interface thereof), an identifier of a battery charger having a location (e.g., a serial number), any other suitable location information, or any combination thereof.

A battery management module may retrieve local charging information from local memory (e.g., in a hard drive, or solid-state memory, remote memory (e.g., stored in a network cloud-based storage system), any other suitable memory accessible to the battery management module, or any combination thereof. Local charging information may be stored in any suitable format such as, for example, a database, a lookup table, a set of flags, one or more ASCII characters or words (e.g., in a text file), any other format, or any combination thereof.

Step 1408 may include a battery management module determining a switch configuration of at least one switch to either connect the first battery module and the second battery module in series or parallel, based at least in part on the battery charging system capability information and the local charging information. In some embodiments, the battery management module may retrieve local charging information which may include a location of the battery pack. The battery management module may, for example, determine a switch configuration for slow charging if the location is the user's home. In a further example, the battery management module may determine a switch configuration for fast charging if the location is away from, or remote from, the user's home. Fast charging may, in some instances, degrade (e.g., have detrimental long-term effects on) a battery pack. Accordingly, it may be desired to limit the number of fast charge cycles that a battery pack, or battery module thereof, experiences. In some embodiments, the battery management module may, for example, determine a switch configuration for fast charging when local charging information indicates that the battery pack (e.g., of an electric vehicle) is located along an Interstate or at a rest stop (e.g., on a road trip). Accordingly, the user may prefer to not wait for longer times to allow a slow charge to complete, and would prefer a fast charge to get back on the road. In a further example, the battery management module may keep track of (e.g., store in retrievable memory) a charging history of the battery pack, and use the charging history to determine the switch configuration. In an illustrative example, the battery management module may determine a switch configuration for fast charging when local charging information indicates the user is "on the road," unless the total number of fast charges is above a threshold in which case the battery management module may determine a switch configuration for slow charging. In some embodiments, local charging information may include a frequency of fast charges, a number of fast charges per time, a battery module capacity, a battery health metric (e.g., whether fast charging having a measurable, detrimental effect), any other suitable historical charging information, or any combination thereof.

Step 1410 may include a battery management module applying the switch configuration to the at least one switch. In some embodiments, step 1410 may include a battery management module sending one or more signals to one or more corresponding switches to change a switch position. In some embodiments, step 1410 may include a battery management module not changing one or more switches when a switch configuration is changed. For example, when applying the switch configuration, one or more switches may remain in a position when changing the coupling of the electric load from the first battery module to the second battery module. Referencing FIGS. 4 and 6, if the battery management module applies a switch configuration to change from arrangement 400 to arrangement 600, switches 256, 260, and 262 remain in the same position.

It is contemplated that the steps or descriptions of FIG. 14 may be used with any other embodiments of this disclosure. In addition, the steps and descriptions described in relation to FIG. 14 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the systems and corresponding components discussed in relation to FIGS. 1-10 could be used, alone or in concert, to perform one or more of the steps in FIG. 14.

Figure 15:
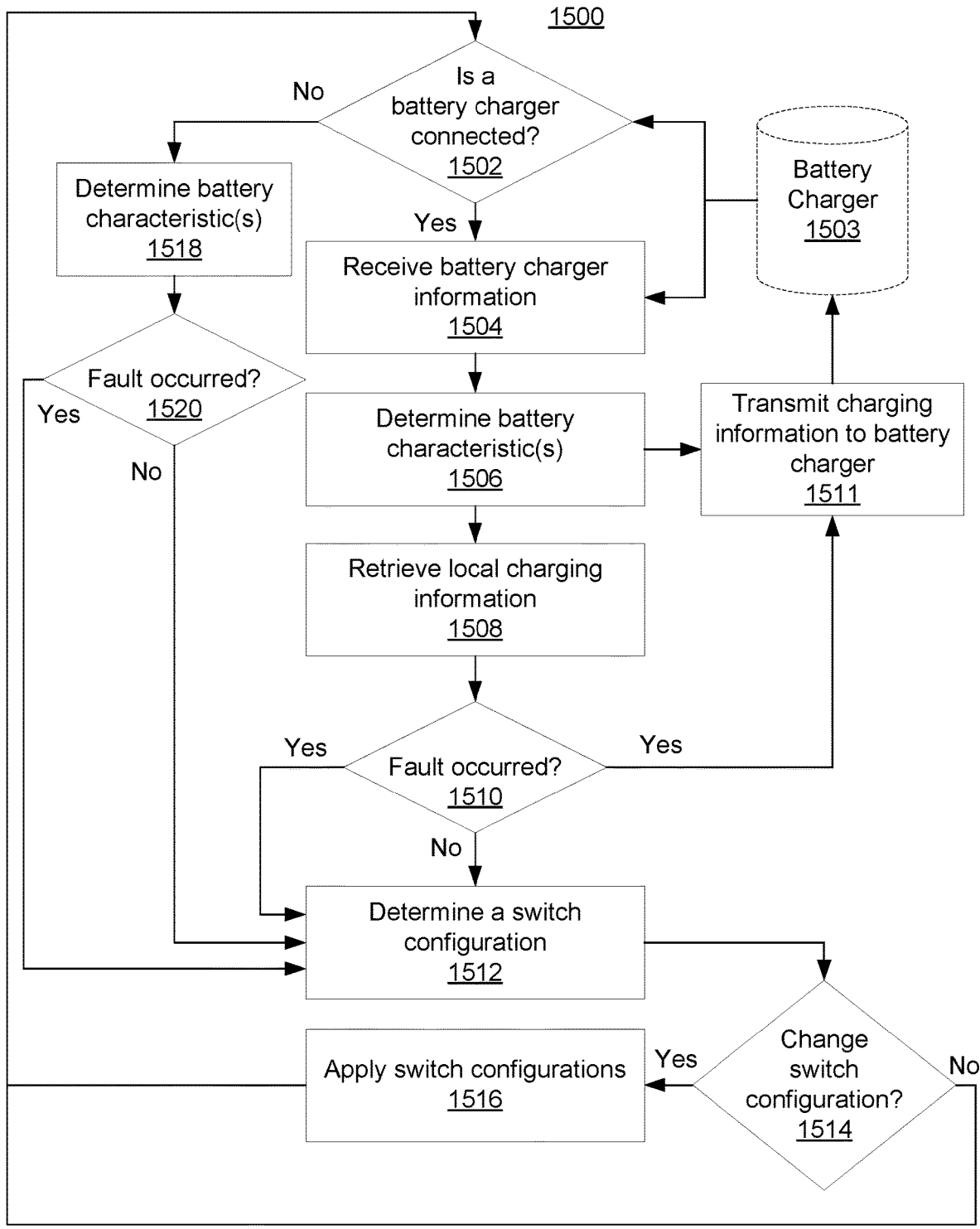
FIG. 15 is a flowchart of an illustrative process for managing battery charging, in accordance with some embodiments of the present disclosure.

A battery management module may manage the overall operation of a battery pack having two or more battery modules. In order to balance utilization, and take advantage of fast charging when desired (or available), the battery management module may determine and apply a switch configuration to manage charging, operation, fault tolerance, or a combination thereof. For example, the battery management module may determine whether to connect battery modules in series or parallel, based on whether fast charge is available at the charger and whether fast charge is desired by a user or appropriate for the battery pack. In a further example, the battery management module may provide fault tolerance during operation, even when not charging. FIG. 15 is a flowchart of an illustrative process 1500 for managing a battery pack, in accordance with some embodiments of the present disclosure. It should be noted that process 1500 or any step thereof could be performed on, or provided by, any of the systems shown in FIGS. 1-10. In addition, one or more steps of process 1500 may be incorporated into or combined with one or more steps of any other processes or embodiments described herein.

Step 1502 may include a battery management module determining whether a battery charger (e.g., battery charger 1503) is connected to a battery pack, an electric vehicle, terminals of the battery management module, any other suitable terminals, or any combination thereof. In some embodiments, a battery management module may include a proximity switch, a set of contacts, a communications interface, or a combination thereof to determine whether a battery charger is connected. For example, a battery charging cable connecting an electric vehicle to a battery charger may include a connector having one or more contacts that open, or close, when positively connected to a charging socket of the electric vehicle. In a further example, a battery management module may determine that a battery charger is connected based on receiving a signal (e.g., an analog signal or a digital signal) from the battery charger. In a further example, a battery management module may determine that a battery charger is connected based on receiving a signal (e.g., an analog signal or a digital signal) from an OBC, which may communicate with the battery charger.

Step 1518 may include a battery management module determining one or more battery characteristics corresponding to one or more battery modules, one or more battery packs, or a combination thereof. Battery characteristics may include, for example, a numerical value (e.g., voltage across the first battery module), a time duration, a charging start time, a state (e.g., a status identifier), an elapsed time since last charge, an elapsed time since last loading, a total number of charges, a cumulative charging time, battery module capacity, any other suitable metric, or any combination thereof. The battery management module may determine one or more characteristics during normal operation (e.g., when the electric vehicle is being driven on the road), during charging (e.g., when the battery pack is coupled to a battery charger), during off periods (e.g., when the electric vehicle is parked), or any combination thereof.

Step 1520 may include a battery management module determining whether a fault has occurred corresponding to one or more battery modules, a battery pack, an electrical component coupled to a battery module, any other suitable equipment that may impact operation, or any combination thereof. Step 1520 may be performed during operation, during an off period (e.g., when the electric vehicle is parked), and not necessarily during charging. For example, a battery management module may perform step 1520 continuously, or at pre-determined intervals, to identify a fault quickly. In some embodiments, the battery management module may perform one or more aspects of step 1202 of FIG. 12 to determine whether a fault has occurred, and which battery module may be impacted. If no fault has occurred, been detected, or been determined to have happened, the battery management module may proceed to step 1512. If the battery management module determines that a fault has occurred, the battery management module may also proceed to step 1512, determining the switch configuration based on whether a fault has occurred, and which fault has occurred. For example, in the case of a fault occurrence, the battery management module may determine a switch configuration that isolates, or otherwise reduces the impact of, the fault on the battery pack.

Step 1504 may include a battery management module receiving battery charger information. In some embodiments, the battery management module may receive charging system information from a battery charger (e.g., battery charger 1503), an OBC of an electric vehicle (e.g., on-board charger 146 of FIG. 1), any other suitable information source, or any combination thereof. In some embodiments, a battery management module may perform steps 1502 and 1504 as a single step. For example, when connected, a battery management module may receive communication from a battery charger which may include battery charger information, and accordingly the battery management module may determine that the battery charger is connected.

Step 1506 may include a battery management module determining one or more battery characteristics corresponding to one or more battery modules, one or more battery packs, or a combination thereof. Battery characteristics may include, for example, a numerical value (e.g., voltage across the first battery module), a time duration, a charging start time, a state (e.g., a status identifier), an elapsed time since last charge, an elapsed time since last loading, a total number of charges, a cumulative charging time, battery module capacity, any other suitable metric, or any combination thereof.

Step 1508 may include a battery management module retrieving local charging information. In some embodiments, the battery management module may retrieve the local charging information from memory (e.g., stored locally). In some embodiments, the battery management module may retrieve the local charging information by receiving information from one or more other subsystems. For example, the battery management module may retrieve information from an OBC (e.g., by submitting a query), including user preference information.

Step 1510 may include a battery management module determining whether a fault has occurred corresponding to one or more battery modules, a battery pack, an electrical component coupled to a battery module, any other suitable equipment that may impact charging, or any combination thereof. In some embodiments, the battery management module may perform one or more aspects of step 1202 of FIG. 12 to determine whether a fault has occurred, and which battery module may be impacted. If no fault has occurred, been detected, or been determined to have happened, the battery management module may proceed to step 1512. If the battery management module determines that a fault has occurred, the battery management module may proceed to step 1511, step 1512, or both. For example, in the case of a fault occurrence, the battery management module may communicate information corresponding to the fault to the battery charger, as well as determine a switch configuration that isolates, or otherwise reduces the impact of, the fault on the battery pack.

Step 1511 may include a battery management module transmitting charging information to a battery charger. For example, the battery management module may transmit local charging information to battery charger 1503. Charging information may include, for example, information about charge progress (e.g., whether the battery pack is fully charged), a voltage limit, a current limit, a fault occurrence, a charging time, any other suitable charging information, any change thereof, or any combination thereof. In some embodiments, the battery management module may transmit charging information to the battery charger to ensure safe, efficient, repeatable, preferred, and timely charging of the battery pack, or one or more modules thereof.

Step 1512 may include a battery management module determining a switch configuration for at least one switch. The battery management module may determine the switch configuration based at least in part on battery charger information, one or more battery characteristics, local charging information, a fault occurrence, any other suitable information, or any combination thereof. In some embodiments, the battery management module may determine a set of one or more switch positions, or "throws," and a schedule thereof, to provide a desired connectivity of terminals among electric loads, a battery charger, two or more battery modules, a pre-charge circuit, measurement circuitry, terminals of any other suitable component, or any combination thereof. For example, a switch configuration may include one or more switch positions, a schedule for when to apply each switch position, a schedule for when and how long to pre-charge, a schedule of when and how long to perform a measurement, any other suitable information for managing a configuration of one or more switches. The at least one switch may include, for example, one or more SPST switches, one or more SPDT switches, any other suitable switch (e.g., a DPDT switch), or a combination thereof. The at least one switch may include a mechanical relay, a solid-state relay, a contactor, a transistor, any other suitable switching device that may be controlled, or any combination thereof.

Step 1514 may include a battery management module determining whether to change an existing switch configuration of the at least one switch. In some embodiments, the battery management module may store, log, retrieve, or otherwise find available, the existing switch configuration. In some embodiments, the battery management module may compare the existing switch configuration to the determined switch configuration to determine whether any of the at least one switches will require a change of switch position. For example, a switch configuration may be stored as a vector of switch position values (e.g., an integer corresponding to each available switch position), and the battery management module may compare the determined and existing switch configuration vectors to determine whether any switch is to be changed (e.g., by subtracting the vectors and identifying nonzero values). In a further example, the battery management module may cycle through a list of switches, checking the existing and determined switch configurations for a difference. If no change in switch configuration is to be applied (e.g., the switches remain in the existing configuration), the battery management module may, for example, return to any of steps 1502, 1504, 1506, 1508, 1510, 1520, 1511, or 1512. As shown in FIG. 15, for example, the battery management module may return to step 1502.

In some embodiments, step 1514 may be optional, combined with step 1512, or otherwise omitted. For example, the battery management module may determine a switch configuration and apply the switch configuration, without determining if the determined switch configuration is different from the existing switch configuration. In a further example, the battery management module may determine changes to an existing switch configuration at step 1512 (e.g., rather than determine a new switch configuration), and then apply the changes at step 1516.

Step 1516 may include a battery management module applying a switch configuration to the at least one switch. For example, the battery management module may apply the switch configuration determined at step 1512 to the at least one switch. In some embodiments, the battery management module may include control circuitry configured to change one or more switch positions (e.g., apply a switch configuration). In some embodiments, the battery management module may change the position of two or more switches at the same time, or at different times. In some embodiments, the battery management module may change the position of a subset of switches at the same time, and another non-overlapping subset of switches at a different time. For example, the battery management module may apply a switch configuration to one or more load switches a first time, one or more mode switches at a second time, and one or more charging switches at a third time. In some embodiments, the battery management module may apply a pre-charge to at least one switch to reduce in-rush current when applying the switch configuration. In some embodiments, upon applying the switch configuration at step 1516, the battery management module may return to any of steps 1502, 1504, 1506, 1508, 1510, 1520, or 1511. As shown in FIG. 15, for example, the battery management module may return to step 1502.

In an illustrative example, referencing process 1500 of FIG. 15, a battery management module may manage low voltage charging or high voltage charging. A battery charger may, for example, be connected to an electric vehicle battery pack, having at least two battery modules operating at nominally 450 V, via a cable with a SAE J1772 compliant connector having AC charging pins, DC charging pins, a ground pin, a proximity pilot pin, and a control pilot pin.

The battery management module may, for example, determine that a battery charger is connected at step 1502 by monitoring an impedance (e.g., a resistance) of the proximity pilot pin. For example, the proximity pilot pin may be coupled to a latch or clip, and assume a first value when the connector is disconnected, a second value when the connector is connected but the latch is pressed, and a third value when the connector is connected and the latch is closed (e.g., ready for charging). In some embodiments, at step 1504 the battery management module receives a 1 kHz square wave from the battery charge, ranging within ±12 V. The duty cycle of the square wave may correspond to a maximum available current that the battery charger is capable of providing. In some embodiments, the battery charger information may also include a charging voltage that is available, or may be selected for charging.

The battery management module, upon receiving a signal (e.g., via a control pilot pin) from the battery charger, may determine local battery characteristics such as, for example, a voltage across positive and negative terminals for each battery module. The battery management module may retrieve local charging information such as, for example, whether fast charging is desired. The battery management module may determine whether a fault has occurred at step 1510 (e.g., based on the voltage across each battery module), and if not, determine a switch configuration. If the battery charger is capable of providing high voltage, illustratively 900 V in this example, and no fault is detected, the battery management module may determine a switch configuration coupling two battery modules in series and the vehicle electric load to the first battery module (e.g., similar to arrangement 400 of FIG. 4). The battery management module may then apply the switch configuration to one or more switches (e.g., to achieve arrangement 400 of FIG. 4) to begin charging.

While charging, the battery management may repeat step 1506 and determine that the voltage across the second battery module is greater than the voltage across the first battery module. Accordingly, the battery management module may, at step 1512, determine a switch configuration that maintains the two battery modules connected in series, but couples the electric load to the second battery module (e.g., similar to arrangement 500 of FIG. 5). The battery management module may then apply the switch configuration to the at least one switch to achieve an arrangement similar to arrangement 500, for example.

It is contemplated that the steps or descriptions of FIG. 15 may be used with any other embodiments of this disclosure. In addition, the steps and descriptions described in relation to FIG. 15 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the systems discussed in relation to FIGS. 1-10 could be used, alone or in concert, to perform one or more of the steps in FIG. 15.

The above-described embodiments of the present disclosure are presented for purposes of illustration and not of limitation, and the present disclosure is limited only by the claims that follow. Additionally, it should be noted that any of the devices or equipment discussed in relation to FIGS. 1-10 could be used to perform one or more of the steps in processes 1100-1500 in FIGS. 11-15, respectively. Furthermore, it should be noted that the features and limitations described in any one embodiment may be applied to any other embodiment herein, and flowcharts or examples relating to one embodiment may be combined with any other embodiments in a suitable manner, done in different orders, performed with addition steps, performed with omitted steps, or done in parallel. For example, each of these steps may be performed in any order or in parallel or substantially simultaneously to reduce lag or increase the speed of the system or method. In addition, the systems and methods described herein may be performed in real time. It should also be noted that the systems and/or methods described above may be applied to, or used in accordance with, other systems and/or methods.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A configurable battery system, comprising:
    a first battery module having a positive terminal and a negative terminal;
    a second battery module having a positive terminal and a negative terminal; and
    at least one switch, wherein the at least one switch comprises at least two poles and wherein:
    in a high voltage configuration of the at least one switch, the first battery module and the second battery module are connected in series, and
    in a low voltage configuration of the at least one switch, the first battery module and the second battery module are connected in parallel, wherein:
        the at least one switch comprises a first single pole double throw (SPDT) switch and second SPDT switch;
        in the high voltage configuration, the first SPDT switch and the second SPDT switch are each in a first switch position, thereby connecting the positive terminal of the first battery module to the negative terminal of the second battery module; and
        in the low voltage configuration:
            the first SPDT switch is in a second switch position, thereby connecting the negative terminal of the first battery module to the negative terminal of the second battery module; and
            the second SPDT switch is in a second switch position, thereby connecting the positive terminal of the first battery module to the positive terminal of the second battery module.

2. The configurable battery system of claim 1, further comprising at least one charger switch configured to connect and disconnect the first and second battery modules to a charger.

3. The configurable battery system of claim 1, wherein in the high voltage configuration:
    a positive terminal of a device load is connected to the positive terminal of the first battery module; and
    a negative terminal of the device load is connected the negative terminal of the first battery module.

4. The configurable battery system of claim 1, further comprising at least one load switch comprising at least two poles, wherein in the high voltage configuration:
    when the at least one load switch is set to a first switch position or positions:
        a positive terminal of a device load is connected to the positive terminal of the first battery module, and
        a negative terminal of the device load is connected to the negative terminal of the first battery module; and
    when the at least one load switch is set to a second switch position or positions:
        the positive terminal of the device load is connected to the positive terminal of the second battery module, and
        the negative terminal of the device load is connected to the negative terminal of the first battery module.

5. The configurable battery system of claim 4, further comprising control circuitry configured to, when in the high voltage configuration, set the position of the at least one load switch based on status information of at least one of the first battery module and the second battery module.

6. The configurable battery system of claim 1, wherein:
    the configurable battery charging system is configured for use in an electric vehicle; and
    in the high voltage configuration, the configurable battery charging system is configured to receive a charging voltage of 900 volts (V).

7. The configurable battery system of claim 6, wherein in the charging configuration, the configurable battery charging system is configured to provide a voltage of 450 V to components of the electric vehicle.

8. The configurable battery system of claim 1, further comprising a battery management module configured to select between the low voltage configuration and the high voltage configuration.

9. A configurable battery system, comprising:
    a first battery module having a positive terminal and a negative terminal;
    a second battery module having a positive terminal and a negative terminal; and
    at least one switch, wherein the at least one switch comprises at least two poles and wherein:
    in a high voltage configuration of the at least one switch, the first battery module and the second battery module are connected in series, and
    in a low voltage configuration of the at least one switch, the first battery module and the second battery module are connected in parallel, wherein:
        the at least one switch comprises two single pole single throw (SPST) switches;
        in the high voltage configuration:
            a first of the two SPST switches is in an off position, and a second of the two SPST switches is in an on position, thereby connecting the positive terminal of the first battery module to the negative terminal of the second battery module; and in the low voltage configuration:
the first of the two SPST switches is in an on position, thereby connecting the negative terminal of the first battery module to the negative terminal of the second battery module, and
the second of the two SPST switches is in an off position.

10. The configurable battery system of claim 9, further comprising at least one load switch comprising at least two poles, wherein in the high voltage configuration:
when the at least one load switch is set to a first switch position or positions:
a positive terminal of a device load is connected to the positive terminal of the first battery module, and
a negative terminal of the device load is connected to the negative terminal of the first battery module; and
when the at least one load switch is set to a second switch position or positions:
the positive terminal of the device load is connected to the positive terminal of the second battery module, and
the negative terminal of the device load is connected to the negative terminal of the first battery module.

11. The configurable battery system of claim 10, further comprising control circuitry configured to, when in the high voltage configuration, set the position of the at least one load switch based on status information of at least one of the first battery module and the second battery module.

12. The configurable battery system of claim 9, wherein:
the configurable battery charging system is configured for use in an electric vehicle; and
in the high voltage configuration, the configurable battery charging system is configured to receive a charging voltage of 900 volts (V).

13. The configurable battery system of claim 12, wherein in the charging configuration, the configurable battery charging system is configured to provide a voltage of 450 V to components of the electric vehicle.

14. A method for managing battery charging of a first battery module and a second battery module that are coupled in series, comprising:
using at least one switch in a first switch configuration to couple an electric load in parallel to the first battery module during charging;
determining, using a battery management module, a first battery characteristic of the first battery module during charging, wherein the first battery characteristic comprises a first voltage across a positive terminal and a negative terminal of the first battery module;
determining, using a battery management module, a second battery characteristic of the second battery module during charging, wherein the second battery characteristic comprises a second voltage across a positive terminal and a negative terminal of the second battery module;
determining, using a battery management module, to apply a second switch configuration to the at least one switch based on the first battery characteristic and the second battery characteristic, wherein the second switch configuration couples the electric load in parallel to the second battery module during charging and wherein determining to apply the second switch configuration to the at least one switch based on the first battery characteristic and the second battery characteristic comprises determining a difference between the first voltage and the second voltage; and
applying, using control circuitry, the second switch configuration to the at least one switch.

15. The method of claim 14, further comprising determining local charging information, wherein the local charging information comprises a preference to charge at high voltage.

16. The method of claim 15, further comprising determining to couple the first battery module and the second battery module in series based at least in part on the local charging information.

17. The method of claim 14, wherein applying the second load switch configuration to the at least one switch further comprises applying a pre-charge configuration to the at least one switch to reduce in-rush current.

18. A method for managing battery charging of a first battery module and a second battery module that are coupled in series, comprising:
using at least one switch in a first switch configuration to couple an electric load in parallel to the first battery module during charging;
determining, using a battery management module, a first battery characteristic of the first battery module during charging, wherein the first battery characteristic comprises a first cumulative time of the first battery module being coupled to the electric load;
determining, using a battery management module, a second battery characteristic of the second battery module during charging, wherein the second battery characteristic comprises a second cumulative time of the second battery module being coupled to the electric load;
determining, using a battery management module, to apply a second switch configuration to the at least one switch based on the first battery characteristic and the second battery characteristic, wherein the second switch configuration couples the electric load in parallel to the second battery module during charging; and
applying, using control circuitry, the second switch configuration to the at least one switch.

19. The method of claim 18, wherein determining to apply the second switch configuration to the at least one switch based on the first battery characteristic and the second battery characteristic comprises determining a difference between the first cumulative time and the second cumulative time.

20. The method of claim 18, further comprising determining local charging information, wherein the local charging information comprises a preference to charge at high voltage.

21. The method of claim 20, further comprising determining to couple the first battery module and the second battery module in series based at least in part on the local charging information.

22. The method of claim 18, wherein applying the second load switch configuration to the at least one switch further comprises applying a pre-charge configuration to the at least one switch to reduce in-rush current.

23. A method for managing battery charging of a first battery module and a second battery module that are coupled in series, comprising:
using at least one switch in a first switch configuration to couple an electric load in parallel to the first battery module during charging;

determining, using a battery management module, a first battery characteristic of the first battery module during charging;

determining, using a battery management module, a second battery characteristic of the second battery module during charging;

determining, using a battery management module, to apply a second switch configuration to the at least one switch based on the first battery characteristic and the second battery characteristic, wherein the second switch configuration couples the electric load in parallel to the second battery module during charging;

applying, using control circuitry, the second switch configuration to the at least one switch; and identifying whether a fault has occurred in the first battery module or the second battery module, wherein determining to apply the second switch configuration to the at least one switch based on the first battery characteristic and the second battery characteristic is further based at least in part on whether the fault has occurred.

24. The method of claim 23, further comprising determining local charging information, wherein the local charging information comprises a preference to charge at high voltage.

25. The method of claim 24, further comprising determining to couple the first battery module and the second battery module in series based at least in part on the local charging information.

26. The method of claim 23, wherein applying the second load switch configuration to the at least one switch further comprises applying a pre-charge configuration to the at least one switch to reduce in-rush current.

27. A method for managing battery charging of a first battery module and a second battery module that are coupled in series, comprising:

using at least one switch in a first switch configuration to couple an electric load in parallel to the first battery module during charging;

determining, using a battery management module, a first battery characteristic of the first battery module during charging;

determining, using a battery management module, a second battery characteristic of the second battery module during charging;

determining, using a battery management module, to apply a second switch configuration to the at least one switch based on the first battery characteristic and the second battery characteristic, wherein the second switch configuration couples the electric load in parallel to the second battery module during charging;

applying, using control circuitry, the second switch configuration to the at least one switch; and determining an elapsed time since a previous change in a switch configuration, wherein determining to apply the second switch configuration to the at least one switch based on the first battery characteristic and the second battery characteristic is further based at least in part on the elapsed time.

28. The method of claim 27, further comprising determining local charging information, wherein the local charging information comprises a preference to charge at high voltage.

29. The method of claim 28, further comprising determining to couple the first battery module and the second battery module in series based at least in part on the local charging information.

30. The method of claim 27, wherein applying the second load switch configuration to the at least one switch further comprises applying a pre-charge configuration to the at least one switch to reduce in-rush current.

* * * * *